(12) United States Patent
 Kaneko

(10) Patent No.: US 11,386,542 B2
(45) Date of Patent: Jul. 12, 2022

(54) TRAINING DATA CREATION METHOD AND DEVICE, AND DEFECT INSPECTION METHOD AND DEVICE

(71) Applicant: FUJIFILM Corporation, Tokyo (JP)

(72) Inventor: Yasuhiko Kaneko, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 271 days.

(21) Appl. No.: 16/822,663

(22) Filed: Mar. 18, 2020

(65) Prior Publication Data

US 2020/0219248 A1 Jul. 9, 2020

Related U.S. Application Data

(63) Continuation of application No. PCT/JP2018/033341, filed on Sep. 10, 2018.

(30) Foreign Application Priority Data

Sep. 19, 2017 (JP) .............................. JP2017-179377

(51) Int. Cl.
 *G06K 9/00* (2022.01)
 *G06T 7/00* (2017.01)
 (Continued)

(52) U.S. Cl.
 CPC ....... *G06T 7/0004* (2013.01); *G01N 21/8851* (2013.01); *G06K 9/6256* (2013.01);
 (Continued)

(58) Field of Classification Search
 None
 See application file for complete search history.

(56) References Cited

U.S. PATENT DOCUMENTS

2004/0047492 A1 3/2004 Muise et al.
2012/0141013 A1 6/2012 Gao et al.
(Continued)

FOREIGN PATENT DOCUMENTS

CN 102749290 A 10/2012
CN 103329167 A 9/2013
(Continued)

OTHER PUBLICATIONS

International Search Report dated Dec. 4, 2018 from the International Searching Authority in International Application No. PCT/JP2018/033341.
(Continued)

*Primary Examiner* — Soo Jin Park
(74) *Attorney, Agent, or Firm* — Sughrue Mion, PLLC

(57) ABSTRACT

Provided are a training data creation method and device, and a defect inspection method and device capable of securing the accuracy of defect inspection even though the number of samples of a defect to be used in creating training data is small.
The training data creation method includes acquiring a training-use image including a received light image created based on reflected light or transmitted light from an inspection object having a defect obtained by irradiating the inspection object with light rays or radiation, executing frequency distribution analysis on the training-use image, receiving an input of a parameter for designating a frequency bandwidth, selecting a frequency bandwidth signal from an analysis result of the frequency distribution analysis according to the frequency bandwidth designated by the parameter, acquiring defect information indicating a defect for an image corresponding to the frequency bandwidth signal, and creating training data to be used in learning of a
(Continued)

defect inspection device, which inspects a defect of the inspection object, based on the defect information.

11 Claims, 17 Drawing Sheets

(51) Int. Cl.
    *G06N 20/00*     (2019.01)
    *G01N 21/88*     (2006.01)
    *G06K 9/62*     (2022.01)
    *G06V 10/145*     (2022.01)

(52) U.S. Cl.
    CPC ........... *G06N 20/00* (2019.01); *G06V 10/145* (2022.01); *G06T 2200/24* (2013.01); *G06T 2207/20081* (2013.01); *G06T 2207/30108* (2013.01)

(56) References Cited

U.S. PATENT DOCUMENTS

| | | | |
|---|---|---|---|
| 2013/0268465 A1 | 10/2013 | McConnell | |
| 2017/0236013 A1 | 8/2017 | Clayton et al. | |
| 2017/0330315 A1 | 11/2017 | Okuda | |
| 2018/0164792 A1* | 6/2018 | Lin | G05B 19/41875 |

FOREIGN PATENT DOCUMENTS

| | | |
|---|---|---|
| CN | 107004265 A | 8/2017 |
| JP | 9-021757 A | 1/1997 |
| JP | 2004-191112 A | 7/2004 |
| JP | 2004-354251 A | 12/2004 |
| JP | 2008-107311 A | 5/2008 |
| JP | 2014-142881 A | 8/2014 |
| JP | 2016-115331 A | 6/2016 |
| JP | 2017-107313 A | 6/2017 |
| KR | 10-1463354 B1 | 11/2014 |

OTHER PUBLICATIONS

International Preliminary Report on Patentability dated Mar. 24, 2020 from the International Bureau in International Application No. PCT/JP2018/033341.

Written Opinion dated Dec. 4, 2018 from the International Bureau in International Application No. PCT/JP2018/033341.

Office Action dated Jan. 30, 2022 in Chinese Application No. 201880060564.0.

Johnson et al., "Fourier spatial frequency analysis for image classification: training the training set", Proceedings of SPIE, Apr. 6, 2016, vol. 9711, Imaging, Manipulation, and Analysis of Biomolecules, Cells and Tissues IX, p. 97110T-1-97110T-5 (6 pages total).

* cited by examiner

FIG. 7
| DEFECT IN TRAINING-USE IMAGE BEFORE TRANSFORM | DEFECT IN IMAGE AFTER TRANSFORM |
|---|---|
| 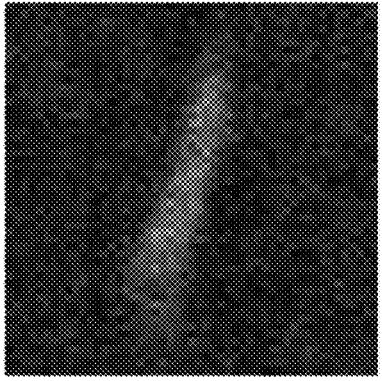 P10-1 | 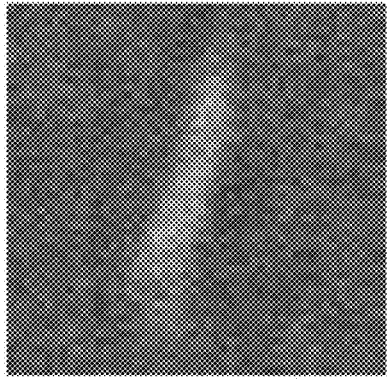 P20-1 |
| 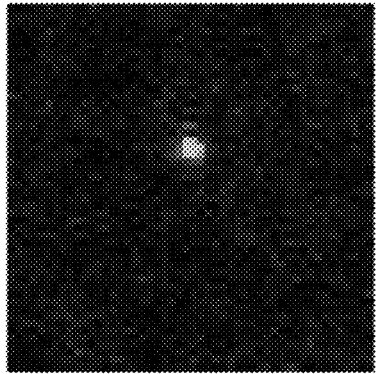 P10-2 | 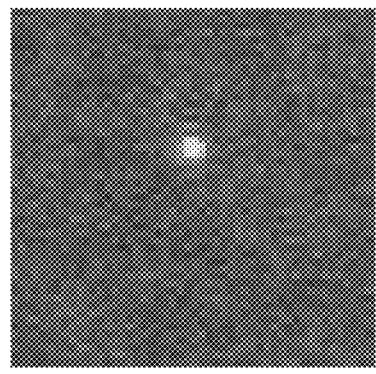 P20-2 |
| 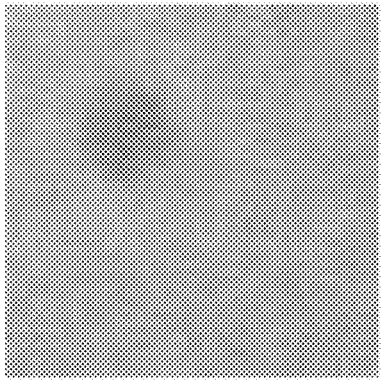 P10-3 | 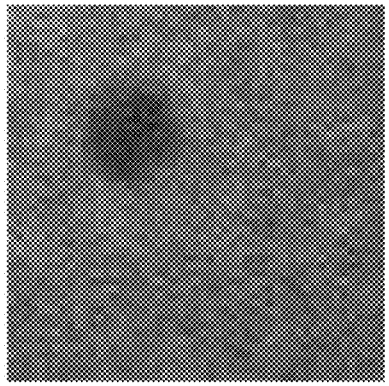 P20-3 |
| ⋮ | ⋮ |

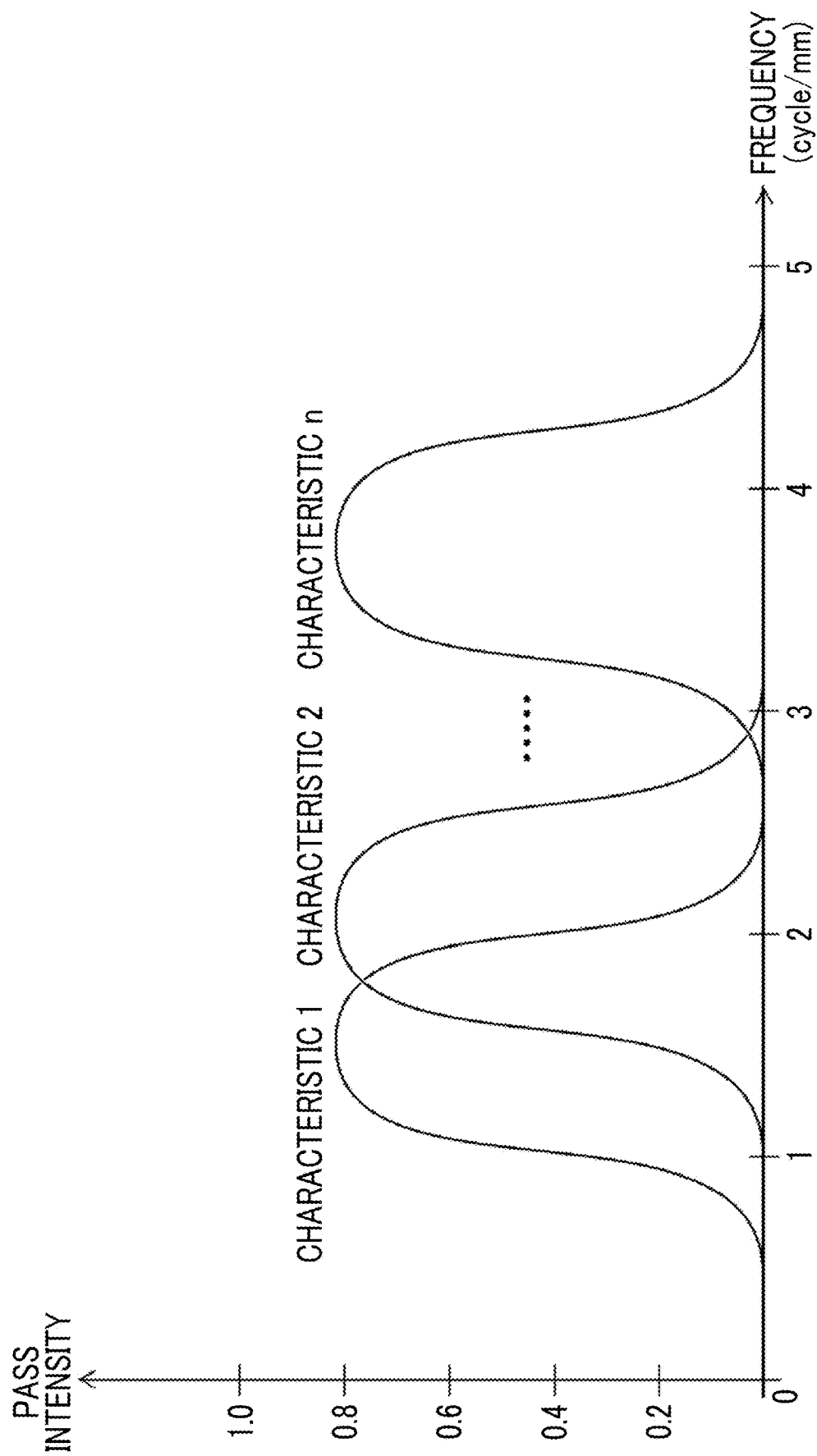

FIG. 14

| TRAINING DATA ||
|---|---|
| INPUT (DEFECT IN IMAGE AFTER TRANSFORM) | OUTPUT (KIND OF DEFECT) |
| P20-1 | CONTAMINATION OF DIFFERENT KIND OF METAL |
| P20-2 | CONTAMINATION OF DIFFERENT KIND OF METAL |
| P20-3 | INFLOW OF AIR |
| ⋮ | NON-DEFECT |
| ⋮ | ⋮ |
| ⋮ | ⋮ |

TRAINING DATA CREATION METHOD AND DEVICE, AND DEFECT INSPECTION METHOD AND DEVICE

CROSS-REFERENCE TO RELATED APPLICATIONS

The present application is a Continuation of PCT International Application No. PCT/JP2018/033341 filed on Sep. 10, 2018 claiming priority under 35 U.S.C § 119(a) to Japanese Patent Application No. 2017-179377 filed on Sep. 19, 2017. Each of the above applications is hereby expressly incorporated by reference, in its entirety, into the present application.

BACKGROUND OF THE INVENTION

1. Field of the Invention

The present invention relates to a training data creation method and device, and a defect inspection method and device, and in particular, a training data creation method and device that creates training data to be used in learning of a defect inspection device, and a defect inspection method and device with learning using training data.

2. Description of the Related Art

JP2004-354251A discloses a defect inspection device that inspects the presence or absence of a defect of an inspection object. In JP2004-354251A, a specific frequency component is detected in an artificial defect image through a band-pass filter, and a neural network unit is made to learn the artificial defect image, thereby compensating for a shortage of samples of a learning pattern ([0031] to [0032]).

JP1997-021757A (JP-H09-021757A) discloses a defect inspection device of an object having a repetitive pattern. In JP1997-021757A (JP-H09-021757A), the repetitive pattern is eliminated from Fourier-transformed light by a spatial frequency filter ([0008]).

JP2004-191112A discloses a defect inspection method that determines quality of an inspection object based on an inspection image acquired by illuminating and imaging the inspection object. In JP2004-191112A, a neural network having generalization capability is used, whereby defect inspection with high accuracy is performed with less training data ([0040]).

SUMMARY OF THE INVENTION

In a case where an accident occurs in equipment, such as piping, to be used in oil transport or the like once, serious damage is given to society. Such equipment, such as piping, is hardly disassembled and inspected. For this reason, inspection of such equipment, such as piping, is performed by nondestructive inspection accompanied by irradiation of piping or the like to be inspected with light rays or radiation. In the nondestructive inspection, a radiologist interprets an image of piping or the like obtained by irradiating piping or the like to be inspected with light rays or radiation to perform inspection of a defect.

As the kind of defect, a defect due to stain, crack, fragment, and contamination of a foreign substance or dissimilar metal, a defect due to inflow of air into a cast at the time of casting, and the like are known. Defects are different in shape and size individually, and many defects may be detected from one image. For this reason, a lot of time is needed to inspect defects in an image without omission.

In order to efficiently perform inspection of a defect using an image, use of machine learning is considered.

In an image obtained by imaging an object to be inspected (hereinafter, referred to as an inspection object), such as piping, since brightness is different depending on a shape, a thickness, a material, or the like of the inspection object, even images obtained by imaging the same kind of defect may be different in shade according to an occurrence point of the defect. For this reason, in order to secure the accuracy of inspection in inspection of a defect using machine learning, there is a need to collect many sample images of a defect corresponding to variations of various shades for each kind of defect.

However, for example, in a case where a defect has a low occurrence frequency, in a case where an object to be inspected belongs to a confidential level, or the like, it is difficult to obtain many sample images of the defect. Among defects, there is a defect that has a low occurrence frequency, but may have a significant influence on the entire equipment in a case where the defect occurs in one part. For this reason, even though it is not possible to sufficiently obtain many sample images of a defect, it is desirable to find defects without omission.

The invention has been accomplished in consideration of such a situation, and an object of the invention is to provide a training data creation method and device, and a defect inspection method and device capable of securing the accuracy of defect inspection even though the number of samples of a defect to be used in creating training data is small.

In order to solve the above-described problem, a first aspect of the invention provides a training data creation method comprising a training-use image acquisition step of acquiring a training-use image including a received light image created based on reflected light or transmitted light from an inspection object having a defect obtained by irradiating the inspection object with light rays or radiation, a frequency distribution analysis step of executing frequency distribution analysis on the training-use image, an input step of receiving an input of a parameter for designating a frequency bandwidth, a frequency bandwidth selection step of selecting a frequency bandwidth signal from an analysis result of the frequency distribution analysis according to the frequency bandwidth designated by the parameter, and a training data creation step of acquiring defect information indicating a defect for an image corresponding to the frequency bandwidth signal and creating training data to be used in learning of a defect inspection device, which inspects a defect of the inspection object, based on the defect information.

According to the first aspect, the frequency distribution analysis is executed on the training-use image, and the frequency bandwidth signal is selected from the analysis result of the frequency distribution analysis, whereby it is possible to obtain an image the shade of which is standardized corresponding to the selected frequency bandwidth signal. The image with the standardized shade is used, whereby it is possible to secure the accuracy of the defect inspection even though the number of training-use images to be used in creating the training data, that is, the number of images of samples of a defect is small.

According to a second aspect of the invention, the training data creation method according to the first aspect further comprises a display step of displaying the image corresponding to the frequency bandwidth signal selected in the frequency bandwidth selection step on a display unit, and in the training data creation step, an input of an instruction indicating whether the image corresponding to the frequency bandwidth signal displayed on the display unit is defective or nondefective is received and the training data is created based on the instruction.

According to the second aspect, the training data is created based on the instruction input from the radiologist of the image corresponding to the frequency bandwidth signal.

According to a third aspect of the invention, in the training data creation method according to the first aspect, in the training-use image acquisition step, the defect information indicating the defect of the inspection object included in the training-use image is stored in a storage unit in association with the training-use image, and in the training data creation step, the defect information stored in association with the training-use image is acquired to create the training data based on the defect information.

According to a fourth aspect of the invention, in the training data creation method according to the third aspect, in the training data creation step, defect information including at least one of a kind or a position of the defect of the inspection object is acquired.

According to the third and fourth aspects, the training data is created based on the defect information attached to the training-use image.

According to a fifth aspect of the invention, the training data creation method according to any one of the first to fourth aspects further comprises a step of receiving registration of a plurality of band-pass filters corresponding to a material of the inspection object and the defect in the inspection object, in the input step, an input of a parameter for designating a band-pass filter to be used in selecting the frequency bandwidth signal from among the plurality of band-pass filters is received, and in the frequency bandwidth selection step, the frequency bandwidth signal is selected using the band-pass filter designated by the parameter.

According to a sixth aspect of the invention, in the training data creation method according to the fifth aspect, in the input step, the band-pass filter to be used in selecting the frequency bandwidth signal is designated according to a material of the inspection object.

According to the fifth and sixth aspects, the band-pass filter is designated according to the material and defect of the inspection object, whereby it is possible to obtain an image the shade of which is standardized for each material and defect of the inspection object.

According to a seventh aspect of the invention, in the training data creation method according to any one of the first to sixth aspects, in the training data creation step, training data including the frequency bandwidth signal selected from the training-use image and the defect information is created.

An eighth aspect of the invention provides a defect inspection method comprising a step of performing learning in a defect inspection device using training data created by the training data creation method according to any one of the first to seventh aspects, a step of acquiring an image to be inspected created based on reflected light or transmitted light from an inspection object to be inspected obtained by irradiating the inspection object to be inspected with light rays or radiation, and a defect inspection step of detecting a defect in the image to be inspected with the defect inspection device having performed the learning.

According to the eighth aspect, the image with the standardized shape is used, whereby it is possible to secure the accuracy of the defect inspection even though the number of samples of the training-use image to be used in creating the training data is small.

According to a ninth aspect of the invention, in the defect inspection method according to the eighth aspect, the defect inspection step comprises a step of executing frequency distribution analysis on the image to be inspected, a step of selecting a frequency bandwidth signal from an analysis result of the frequency distribution analysis on the image to be inspected, and a step of detecting the defect in the image to be inspected based on the frequency bandwidth signal selected from an analysis result of the frequency distribution analysis on the image to be inspected and the training data.

According to the ninth aspect, the shade of the image to be inspected is standardized similarly to the training-use image, whereby it is possible to secure the accuracy of the defect inspection.

A tenth aspect of the invention provides a training data creation device comprising a training-use image acquisition unit that acquires a training-use image including a received light image created based on reflected light or transmitted light from an inspection object having a defect obtained by irradiating the inspection object with light rays or radiation, a frequency distribution analysis unit that executes frequency distribution analysis on the training-use image, an input unit that receives an input of a parameter for designating a frequency bandwidth, a frequency bandwidth selection unit that selects a frequency bandwidth signal from an analysis result of the frequency distribution analysis according to the frequency bandwidth designated by the parameter, a defect information acquisition unit that acquires defect information indicating a defect for an image corresponding to the frequency bandwidth signal, and a training data creation unit that creates training data to be used in learning of a defect inspection device, which inspects a defect of the inspection object, based on the defect information.

An eleventh aspect of the invention provides a defect inspection device comprising the training data creation device according to the tenth aspect, an image-to-be-inspected acquisition unit that acquires an image to be inspected created based on reflected light or transmitted light from an inspection object to be inspected obtained by irradiating the inspection object to be inspected with light rays or radiation, and a defect inspection unit that performs learning using training data created by the training data creation device and detects a defect in the image to be inspected.

According to the invention, the frequency distribution analysis is executed on the training-use image, and the frequency bandwidth signal is selected from the analysis result of the frequency distribution analysis, whereby it is possible to obtain an image the shade of which is standardized corresponding to the selected frequency bandwidth signal. The image with the standardized shade is used, whereby it is possible to secure the accuracy of the defect inspection even though the number of training-use images to be used in creating the training data, that is, the number of images of samples of a defect is small.

BRIEF DESCRIPTION OF THE DRAWINGS

FIG. 7 is a diagram showing an image of defect in the training-use image and an image of a defect in the image after transform in a comparative manner.

FIG. 9 is an explanatory view relating to a band-pass filter.

FIG. 14 is a diagram showing training data in a simplified form.

DESCRIPTION OF THE PREFERRED EMBODIMENTS

Hereinafter, embodiments of a training data creation method and device, and a defect inspection method and device according to the invention will be described referring to the accompanying drawings.

First Embodiment

[Configuration of Defect Inspection System]

Figure 1:
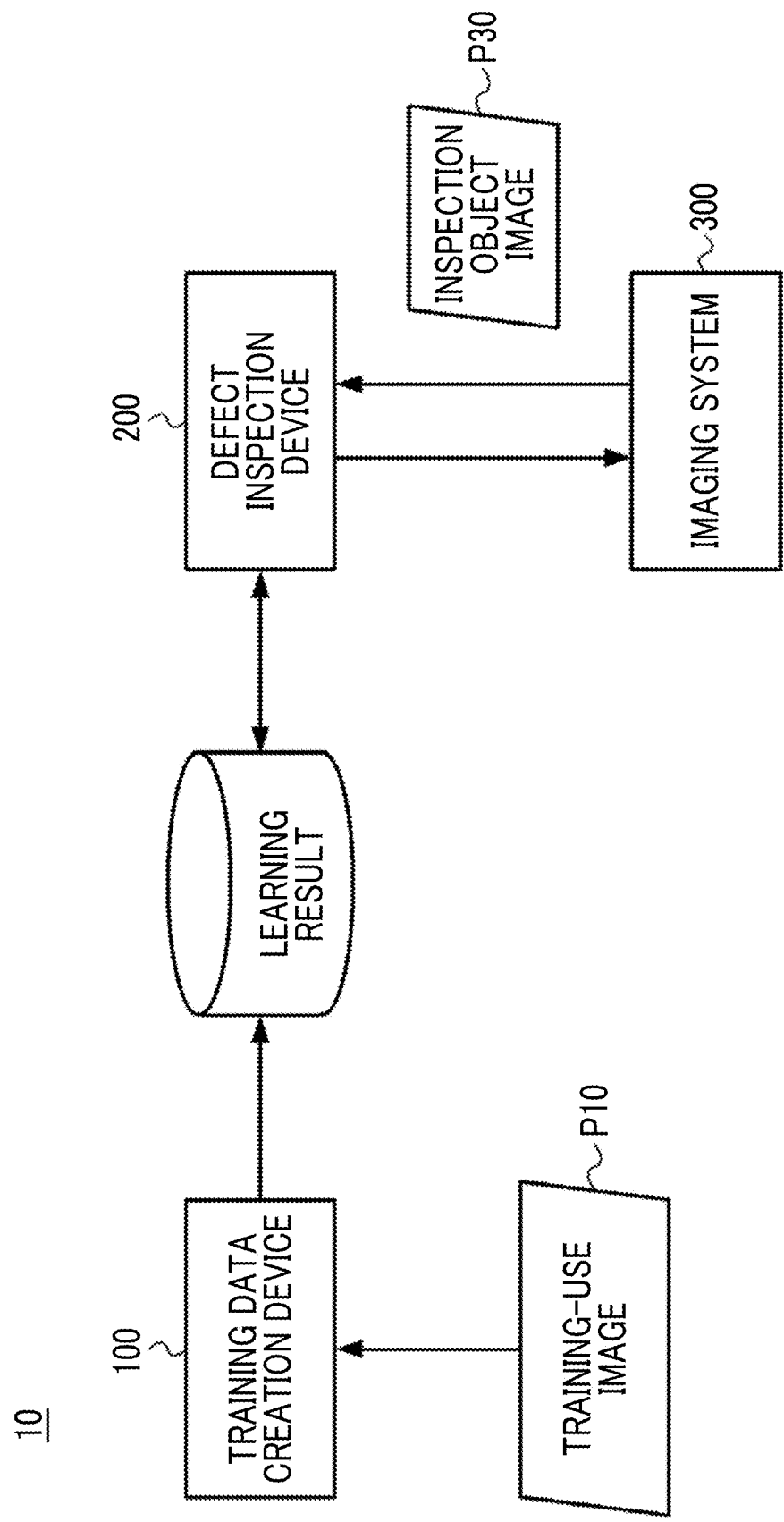
FIG. 1 is a block diagram showing a defect inspection system according to a first embodiment of the invention.

FIG. 1 is a block diagram showing a defect inspection system according to a first embodiment of the invention.

As shown in FIG. 1, a defect inspection system 10 according to the embodiment performs inspection of a defect accompanied with machine learning on an object (hereinafter, referred to as an inspection object) to be inspected, such as an industrial product, and comprises a training data creation device 100 and a defect inspection device 200.

The training data creation device 100 receives an input of a training-use image P10 and creates training data (see FIGS. 13 and 14) to be used in learning of a defect determiner 126 (see FIG. 4) based on the training-use image P10. Here, the training-use image P10 is an image including a sample of the occurrence of a defect, and is an image obtained by imaging an industrial product or the like identical or similar to an inspection object OBJ to be inspected with the defect inspection device 200. The training-use image P10 may be an image obtained by imaging an inspection object in which a defect occurs spontaneously while the inspection object is being used or an image obtained by imaging an inspection object to which a defect is added artificially. As the training-use image P10, for example, an image that is provided as a sample from a designer or a manager of a facility or the like, in which the inspection object is mounted, can be used.

The training data creation device 100 transfers a defect determiner 222 (see FIG. 4) after learning as a learning result to the defect inspection device 200.

An imaging system 300 captures an image of the inspection object OBJ to be inspected with the defect inspection device 200. The imaging system 300 irradiates the inspection object OBJ with radiation and captures the image of the inspection object OBJ based on reflected light reflected by the inspection object OBJ or transmitted light transmitted through the inspection object OBJ.

Figure 4:
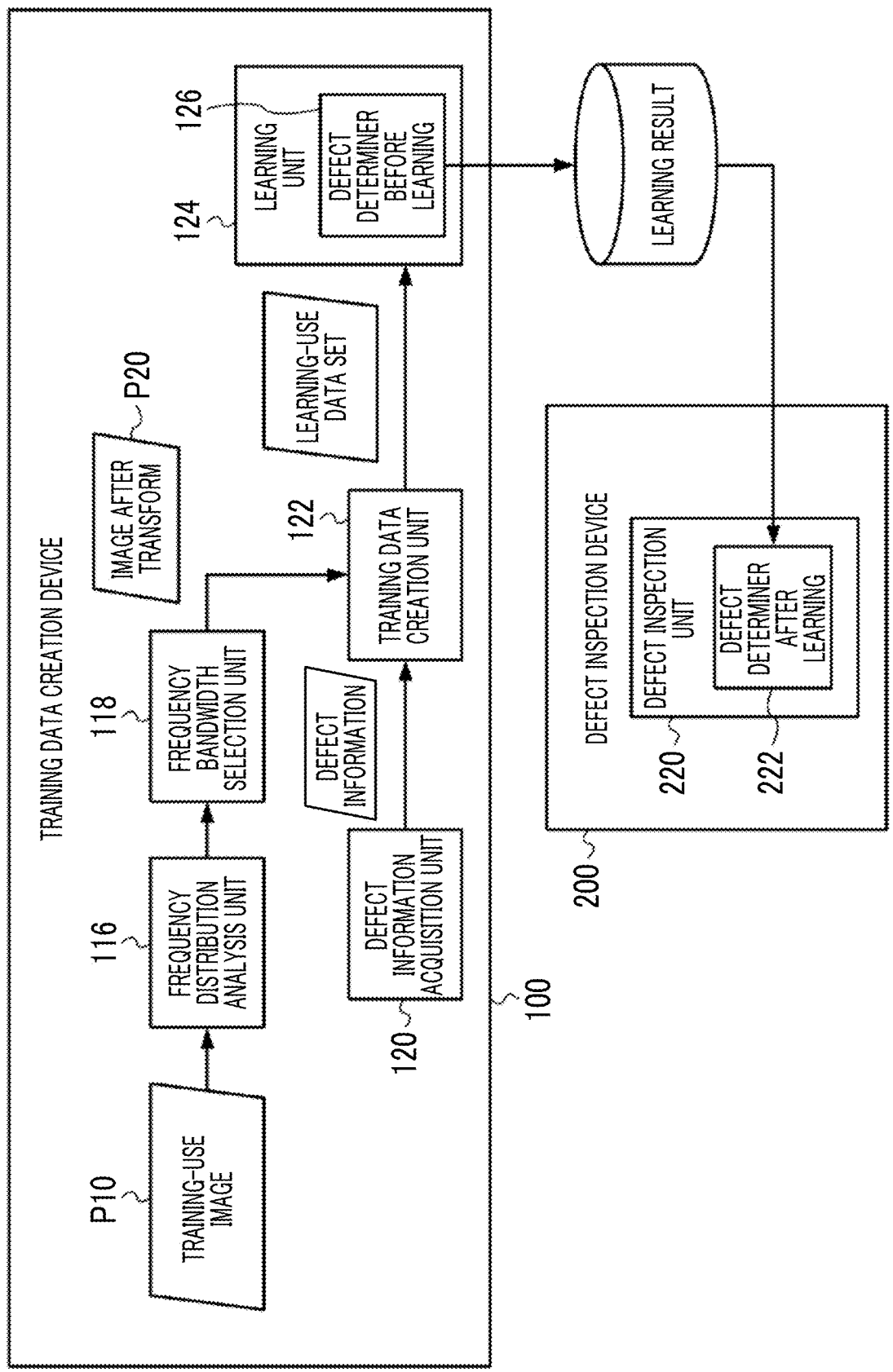
FIG. 4 is a block diagram showing, in an extracted manner, configurations related to creation of training data and learning using training data in the defect inspection system according to the first embodiment of the invention.

The defect inspection device 200 inspects whether or not a defect is included in an inspection object image P30 as the image of the inspection object OBJ captured by the imaging system 300 or the like using the defect determiner 222 after learning (see FIG. 4). In a case where a defect is included in the inspection object image P30, the defect inspection device 200 specifies the position and the kind of the defect using the defect determiner 222 after learning (see FIG. 4).

[Configuration of Training Data Creation Device]

Figure 2:
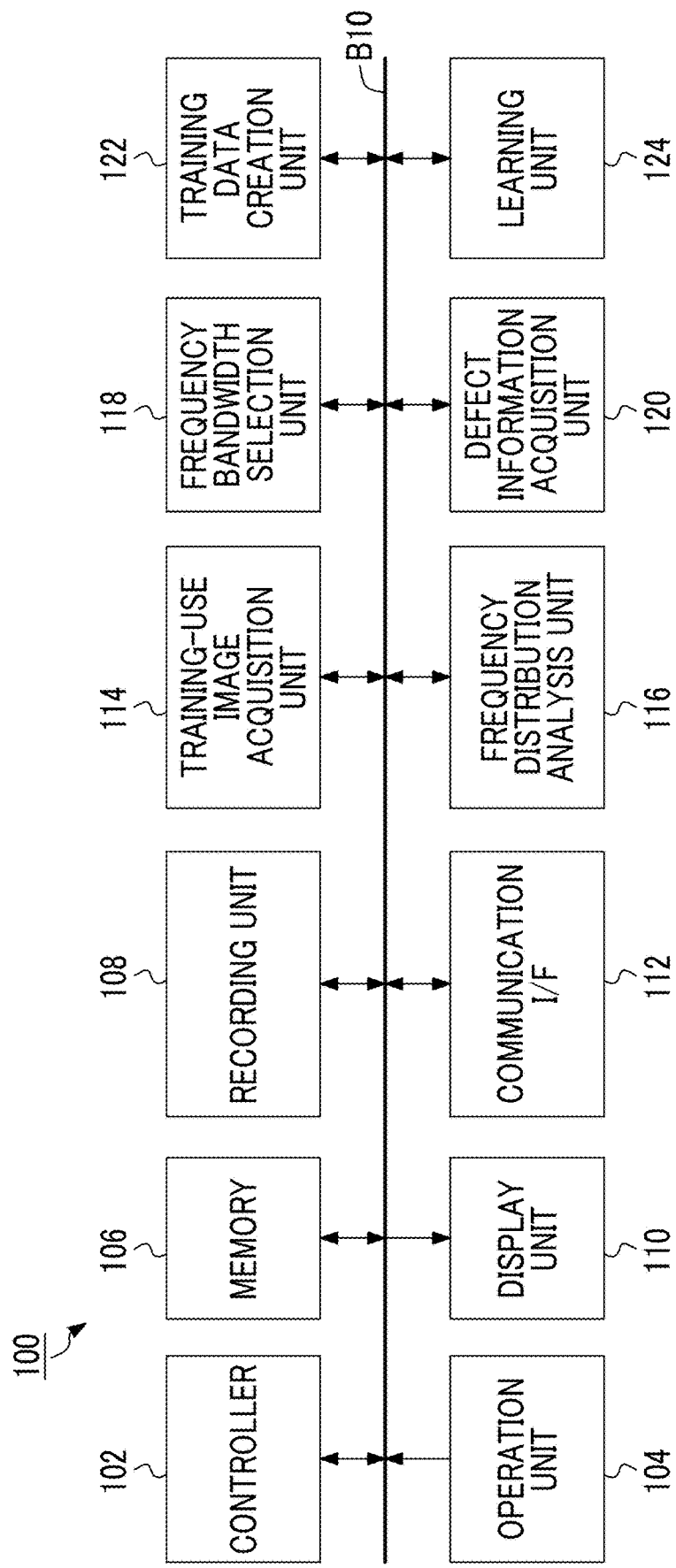
FIG. 2 is a block diagram showing a training data creation device according to the first embodiment of the invention.

Next, the training data creation device 100 according to the embodiment will be described referring to FIG. 2. FIG. 2 is a block diagram showing the training data creation device 100.

As shown in FIG. 2, the training data creation device 100 according to the embodiment comprises a controller 102, an operation unit 104, a memory 106, a recording unit 108, a display unit 110, a communication interface (communication I/F) 112, a training-use image acquisition unit 114, a frequency distribution analysis unit 116, a frequency bandwidth selection unit 118, a defect information acquisition unit 120, a training data creation unit 122, and a learning unit 124.

The controller 102 includes a central processing unit (CPU) that controls the operation of each unit of the training data creation device 100. The controller 102 can transmit and receive control signals and data to and from the training data creation device 100 through a bus B10. The controller 102 receives an operation input from an operator through the operation unit 104 and transmits a control signal according to the operation input to each unit of the training data creation device 100 through the bus B10 to control the operation of each unit.

The operation unit 104 is an input device that receives an operation input from the operator, and includes a keyboard that is provided for character input or the like, and a pointing device (for example, a mouse, a trackball, or the like) that is provided for operating a pointer, icons, and the like displayed on the display unit 110. As the operation unit 104, instead of the keyboard and the pointing device or in addition to the keyboard and the pointing device, a touch panel may be provided on a surface of the display unit 110.

The memory 106 includes a random access memory (RAM) that is used as a work area for various arithmetic operations to be performed by the controller 102 or the like, and a video random access memory (VRAM) that is used as an area for temporarily storing image data output to the display unit 110.

The recording unit 108 stores data including the training-use image P10, a control program to be used by the controller 102, and the like. As the recording unit 108, for example, a device including a magnetic disk, such as a hard disk drive (HDD), a device including a flash memory, such as an embedded multi media card (eMMC) or a solid state drive (SSD), or the like can be used.

The display unit 110 is a device that displays an image. As the display unit 110, for example, a liquid crystal monitor can be used.

The communication I/F 112 is means for performing communication with an external device through a network. As a transmission and reception method of data between the training data creation device 100 and the external device, wired communication or wireless communication (for example, a local area network (LAN), a wide area network (WAN), Internet connection, or the like) can be used.

The training-use image acquisition unit 114 can receive an input of the training-use image P10 through the communication I/F 112. A method of inputting the training-use image P10 to the training data creation device 100 is not limited to communication through the network. For example, a universal serial bus (USB) cable, Bluetooth (Registered Trademark), infrared communication, or the like may be used or the training-use image P10 may be stored in a recording medium (for example, a memory card) that is attachable and detachable with respect to the training data creation device 100 and is readable by the training data creation device 100, and the training-use image acquisition unit 114 may receive an input of the training-use image P10 through the recording medium.

The frequency distribution analysis unit 116 executes frequency distribution analysis on the training-use image P10. The frequency distribution analysis unit 116 performs Fourier transform, for example, fast Fourier transform (FFT) or discrete cosine transform (DCT), on the training-use image P10 to decompose the training-use image P10 into frequency bandwidth signals of respective frequency components. Then, the frequency distribution analysis unit 116 eliminates a global shade distribution, for example, change in shade at a low frequency from the frequency bandwidth signal acquired from the training-use image P10 to standardize a shade difference due to a defect to a shade difference centering on reference density (for example, gray 50%).

The frequency bandwidth selection unit 118 selects a frequency bandwidth signal to be used in creating training data from an analysis result in the frequency distribution analysis unit 116 according to a material of the inspection object included in the training-use image P10 and the kind of a defect to be inspected in the inspection object.

The defect information acquisition unit 120 acquires defect information of a defect included in an image corresponding to the frequency bandwidth signal selected by the frequency bandwidth selection unit 118.

The training data creation unit 122 cuts individual defect images P20-1, P20-2, P20-3, . . . , and P20-n from an image P20 after transform based on the defect information. Then, the training data creation unit 122 creates training data with the individual defect images P20-1, P20-2, P20-3, . . . , and P20-n as input and the kinds of the defects as output.

The learning unit 124 makes the defect determiner 126 (see FIG. 4) perform learning using the training data created by the training data creation unit 122. The learning unit 124 transfers the defect determiner 222 after learning (see FIG. 4) to the defect inspection device 200.

All or a part of the functions of the training-use image acquisition unit 114, the frequency distribution analysis unit 116, the frequency bandwidth selection unit 118, the defect information acquisition unit 120, the training data creation unit 122, and the learning unit 124 may be constructed by dedicated electric circuits or may be constructed as functions to be implemented by the CPU of the controller 102.

[Configuration of Defect Inspection Device]

Figure 3:
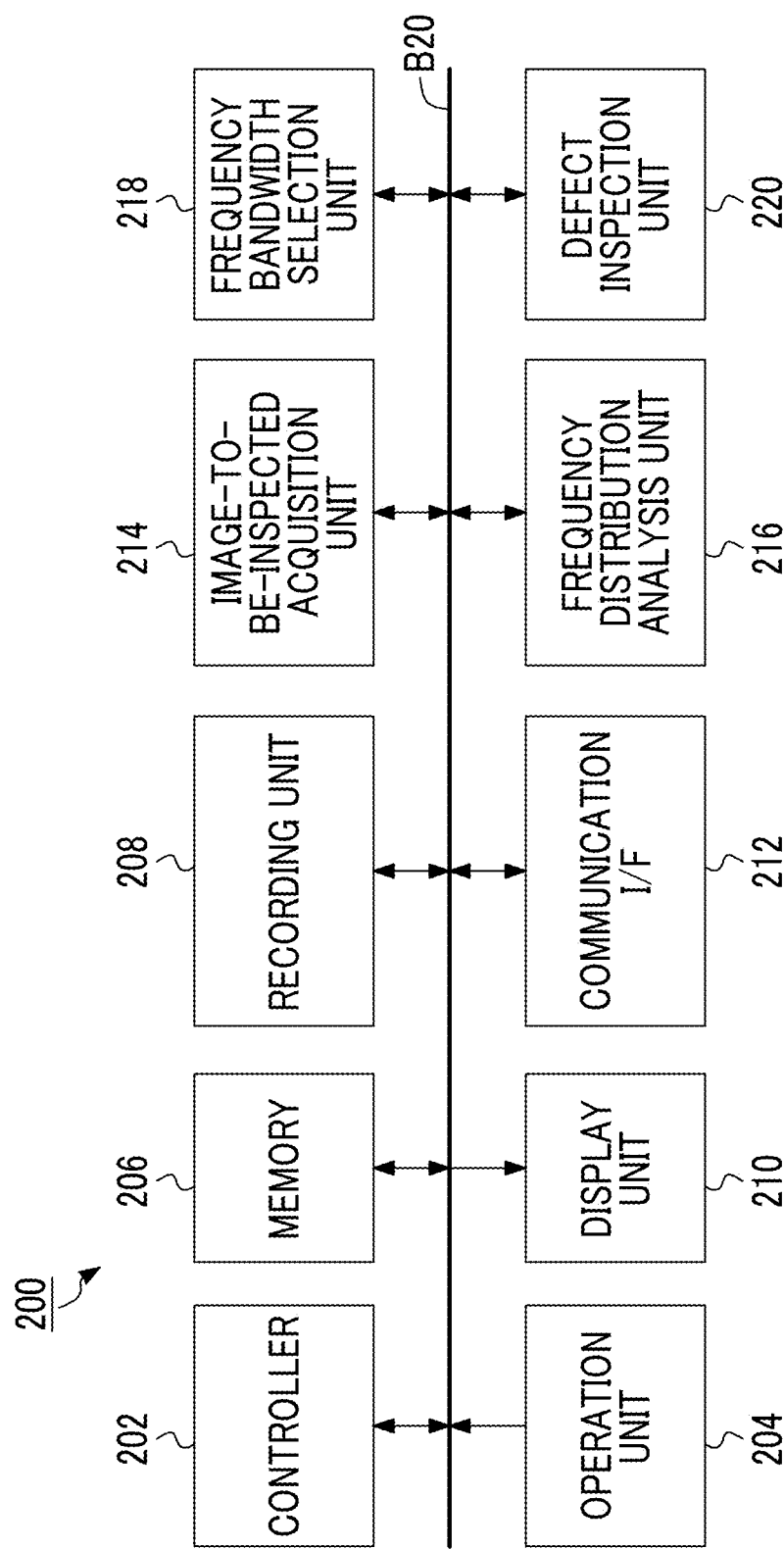
FIG. 3 is a block diagram showing a defect inspection device according to the first embodiment of the invention.

Next, the defect inspection device 200 according to the embodiment will be described referring to FIG. 3. FIG. 3 is a block diagram showing the defect inspection device 200.

As shown in FIG. 3, the defect inspection device 200 according to the embodiment comprises a controller 202, an operation unit 204, a memory 206, a recording unit 208, a display unit 210, a communication interface (communication I/F) 212, an image-to-be-inspected acquisition unit 214, a frequency distribution analysis unit 216, a frequency bandwidth selection unit 218, and a defect inspection unit 220.

The controller 202 includes a central processing unit (CPU) that controls the operation of each unit of the defect inspection device 200. The controller 202 can transmit and receive control signals and data to and from the defect inspection device 200 through a bus B20. The controller 202 receives an operation input from the operator through the operation unit 204 and transmits a control signal according to the operation input to each unit of the defect inspection device 200 through the bus B20 to control the operation of each unit.

The operation unit 204 is an input device that receives an operation input from the operator, and includes a keyboard that is provided for character input or the like, and a pointing device (for example, a mouse, a trackball, or the like) that is provided for operating a pointer, icons, and the like displayed on the display unit 210. As the operation unit 204, instead of the keyboard and the pointing device or in addition to the keyboard and the pointing device, a touch panel may be provided on a surface of the display unit 210.

The memory 206 includes a random access memory (RAM) that is used as a work area for various arithmetic operations to be performed by the controller 202 or the like, and a video random access memory (VRAM) that is used as an area for temporarily storing image data output to the display unit 210.

The recording unit 208 stores data including the inspection object image P30 obtained by imaging the inspection object OBJ to be inspected, a control program to be used by the controller 202, and the like. As the recording unit 208, for example, a device including a magnetic disk, such as a hard disk drive (HDD), a device including a flash memory, such as an embedded multi media card (eMMC) or a solid state drive (SSD), or the like can be used.

The display unit 210 is a device that displays an image. As the display unit 210, for example, a liquid crystal monitor can be used.

The communication I/F 212 is means for performing communication with an external device through the network. As a transmission and reception method of data between the defect inspection device 200 and the external device, wired communication or wireless communication (for example, a local area network (LAN), a wide area network (WAN), Internet connection, or the like) can be used.

The image-to-be-inspected acquisition unit 214 receives an input of the inspection object image P30 as the image of the inspection object OBJ captured by the imaging system 300 through the communication I/F 212. A method of inputting the inspection object image P30 to the defect inspection device 200 is not limited to communication through the network. For example, a universal serial bus (USB) cable, Bluetooth (Registered Trademark), infrared communication, or the like may be used or the inspection object image P30 may be stored in a recording medium (for example, a memory card) that is attachable and detachable with respect to the defect inspection device 200 and is readable by defect inspection device 200, and the inspection object image P30 may be input to the defect inspection device 200 through the recording medium.

The frequency distribution analysis unit 216 executes frequency distribution analysis on the inspection object image P30. The frequency distribution analysis unit 216 performs Fourier transform, for example, fast Fourier transform (FFT) or discrete cosine transform (DCT), on the inspection object image P30 to decompose the inspection object image P30 into frequency bandwidth signals of respective frequency components. Then, the frequency distribution analysis unit 216 eliminates a global shade distribution, for example, change in shade at a low frequency from the frequency bandwidth signal acquired from the inspection object image P30 to standardize a shade difference due to a defect to a shade difference centering on reference density (for example, gray 50%).

The frequency bandwidth selection unit 218 selects a frequency bandwidth signal from an analysis result in the frequency distribution analysis unit 216 according to a material of the inspection object included in the inspection object image P30 and the kind of a defect to be inspected in the inspection object.

The defect inspection unit 220 determines the presence or absence (defect or non-defect) of a defect and the kind of the defect using the defect determiner 222 (see FIG. 4) transferred from the learning unit 124 of the training data creation device 100. The defect inspection unit 220 makes the display unit 210 display a result of defect inspection.

All or a part of the functions of the image-to-be-inspected acquisition unit 214, the frequency distribution analysis unit 216, the frequency bandwidth selection unit 218, and the defect inspection unit 220 may be constructed by dedicated electric circuits or may be constructed as functions to be implemented by the CPU of the controller 202.

[Configurations relating to Training Data Creation and Learning]

Next, the creation of the training data and learning using the training data will be described referring to FIGS. 4 to 14.

FIG. 4 is a block diagram showing, in an extracted manner, configurations related to the creation of the training data and learning using the training data in the defect inspection system 10.

The frequency distribution analysis unit 116 performs FFT on the training-use image P10 acquired by the training-use image acquisition unit 114. Then, the frequency distribution analysis unit 116 eliminates a global shade distribution, for example, change in shade at a low frequency from the frequency bandwidth signal acquired from the training-use image P10 to standardize a shade difference due to a defect to a shade difference centering on reference density (for example, gray 50%).

The frequency bandwidth selection unit 118 selects a frequency bandwidth signal to be used in creating training data from an analysis result in the frequency distribution analysis unit 116 according to a material of the inspection object included in the training-use image P10 and the kind of a defect to be inspected in the inspection object.

The defect information acquisition unit 120 acquires defect information of a defect included in an image corresponding to the frequency bandwidth signal selected by the frequency bandwidth selection unit 118.

Figure 5:
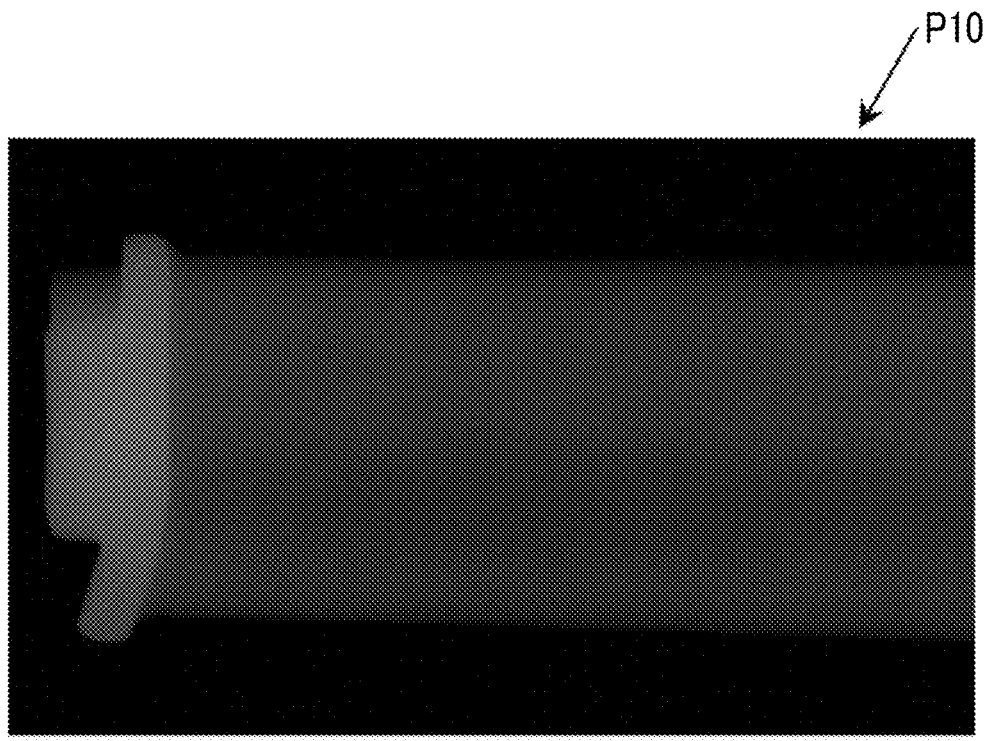
FIG. 5 is a diagram showing an example of a training-use image.
Figure 6:
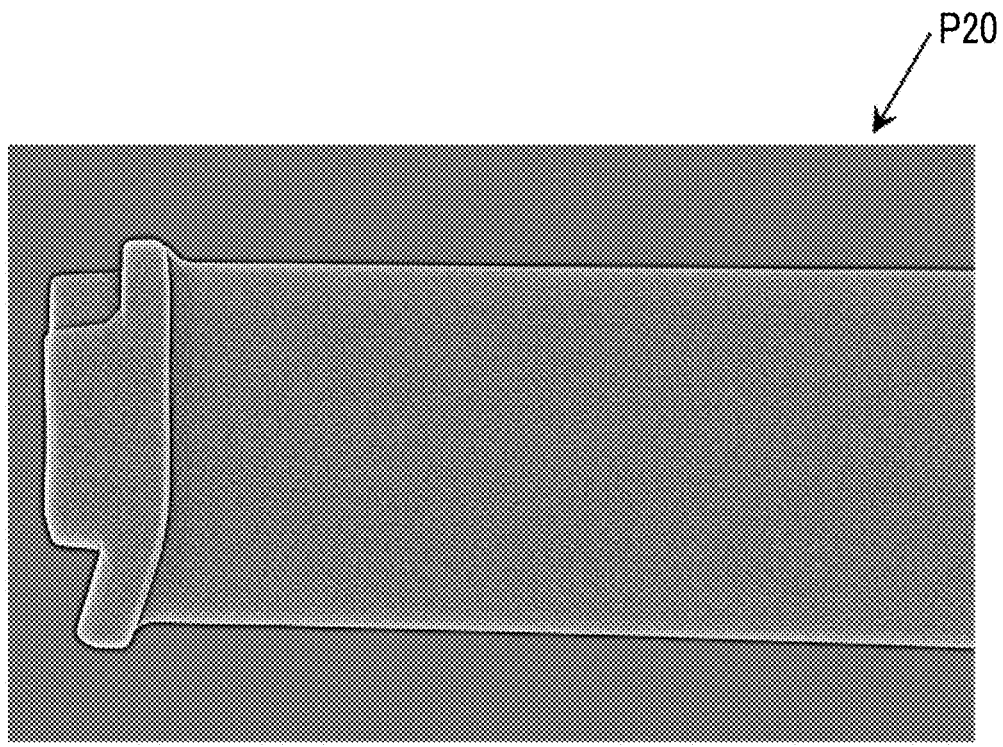
FIG. 6 is a diagram showing an example of an image after transform.

FIG. 5 is a diagram showing an example of the training-use image P10, and FIG. 6 is a diagram showing an example of the image P20 after transform. FIG. 7 is a diagram showing an image of a defect in the training-use image P10 and an image of a defect in the image P20 after transform in a comparative manner.

The image of the training-use image P10 shown in FIG. 5 is an image in a case where X-rays are transmitted through the inspection object, and includes a difference in brightness due to the shape, the thickness, the material, or the like of the inspection object. For this reason, as shown in FIG. 7, in defect images P10-1, P10-2, P10-3, . . . , and P10-$n$ cut from the training-use image P10, change in shade due to a defect is changed by the influence of the difference in brightness due to the shape, the thickness, the material, or the like of the inspection object. Accordingly, in a case where learning is performed using the defect images P10-1, P10-2, P10-3, . . . , and P10-$n$ cut from the training-use image P10, in order to secure the accuracy of the defect inspection, there is a need to collect many sample images of a defect corresponding to variations of various shades for each kind of defect.

In contrast, the frequency distribution analysis unit 116 according to the embodiment transforms the training-use image P10 to an image with a shade difference of 256 gradations with gray 50% as reference density as an example. In the image P20 after transform shown in FIG. 6, the shade is standardized, and the influence of the difference in brightness due to the shape, the thickness, the material, or the like of the inspection object is eliminated. For this reason, as shown in FIG. 7, in the defect images P20-1, P20-2, P20-3, . . . , and P20-$n$ cut from the image P20 after transform, change in shade due to a defect is represented under the standardized shade.

In the embodiment, the image with the standardized shade difference is used, whereby it is possible to secure the accuracy of the defect inspection while reducing the number of training-use images P10 to be used in creating the training data.

FIGS. 8A to 8D are explanatory views relating to the frequency distribution analysis. In FIGS. 8A to 8D, the horizontal axis indicates a frequency, and the vertical axis indicates intensity of a signal.

Figure 8A:
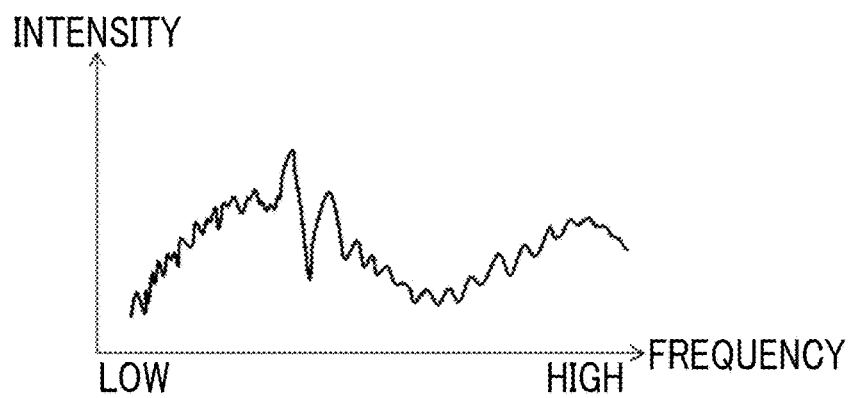
FIGS. 8A to 8D are explanatory views relating to frequency distribution analysis.

FIG. 8A is a diagram showing the original training-use image P10. In FIG. 8A, the global shade distribution, such as change in shade at a low frequency, that is, the difference in brightness due to the shape, the thickness, the material, or the like of the inspection object is represented.

First, the frequency distribution analysis unit 116 applies FFT to the intensity distribution of FIG. 8A to eliminate change in shade at a low frequency. With this, as shown in FIG. 8B, the influence of the difference in brightness due to the shape, the thickness, the material, or the like of the inspection object is eliminated from the intensity distribution of FIG. 8A.

Figure 8B:
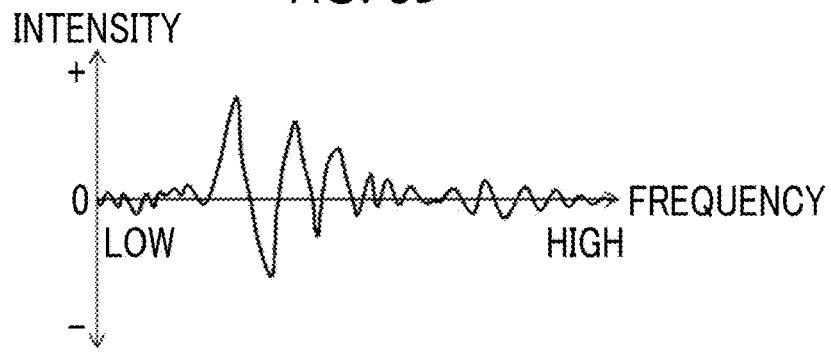

Next, the frequency distribution analysis unit 116 adjusts a maximum value and a minimum value in the intensity distribution of FIG. 8B. The frequency distribution analysis unit 116 performs the transform of the intensity distribution, for example, such that the difference between the maximum value and the minimum value has 256 gradations. The transform of the intensity distribution may be performed by linear transform for scaling the intensity distribution of FIG. 8B in a vertical axis direction.

In the linear transform, in a case where information relating to minute change in shade between the maximum value and the minimum value is lost, nonlinear transform may be performed to leave minute change in shade. Specifically, while a reduction rate of a portion that has minute change in shade may decrease, a reduction rate of a portion where there is no minute change in shade, that is, a portion that has no minute change in shade or is monotonous may increase.

Figure 8C:
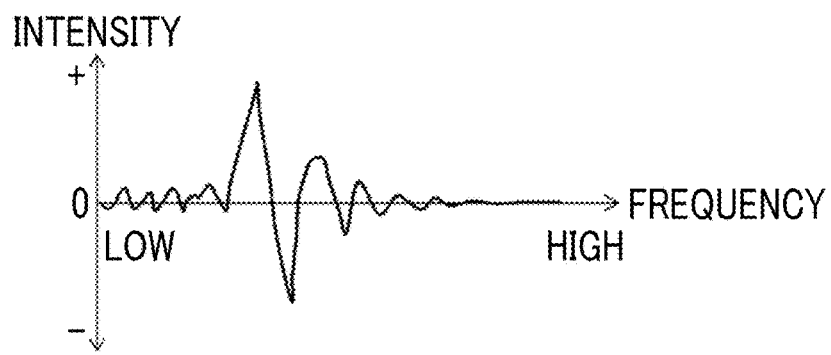
Figure 8D:
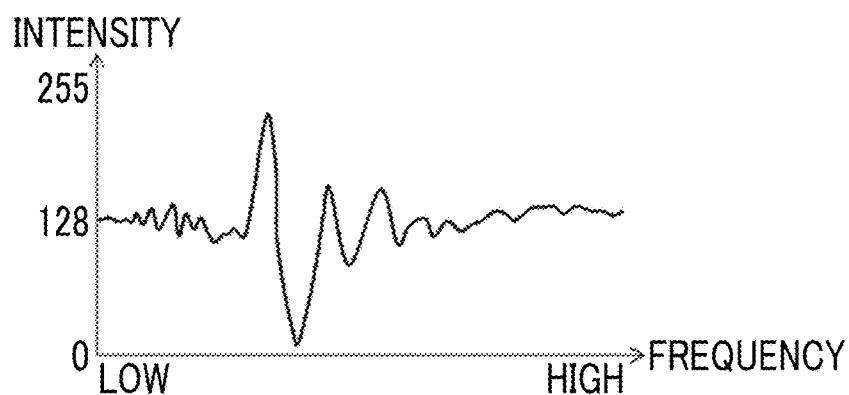

Next, the frequency distribution analysis unit 116 shifts the intensity distribution of FIG. 8C in the vertical axis direction to set the maximum value of the shade to 255 and to set the minimum of the shade to 0. With this, as shown in FIG. 8D, an image with the shade difference of the 256 gradations, in which the distribution of the shade is standardized, is created.

The frequency bandwidth selection unit 118 selects a frequency bandwidth from the image with the shade difference of the 256 gradations according to the material of the inspection object and the kind of the defect. The frequency bandwidth selection unit 118 comprises a band-pass filter that is provided to select a frequency bandwidth according to the material of the inspection object and the kind of the defect.

FIG. 9 is an explanatory view relating to the band-pass filter. In FIG. 9, the horizontal axis indicates a frequency (cycle/mm), and the vertical axis indicates relative intensity (pass intensity or pass rate) of a signal to be passed.

As shown in FIG. 9, a characteristic 1, a characteristic 2, . . . , and a characteristic n are characteristic curves (Look-Up Table (LUT)) in which frequency bandwidths to be passed are different from one another. The frequency bandwidth selection unit 118 selects a band-pass filter represented by the characteristic curves according to the material of the inspection object and the kind of the defect. The operator can select the band-pass filter by inputting a parameter for designating the band-pass filter through an operation input from the operation unit 104. The frequency bandwidth selection unit 118 applies the selected band-pass filter to the image with the shade difference of the 256 gradations, thereby creating the image P20 after transform to be used in creating the training data.

The frequency bandwidth selection unit 118 may store information relating to a frequency bandwidth suitable for detecting the defect in advance according to the material of the inspection object and the kind of the defect. In this case, the frequency bandwidth selection unit 118 makes the display unit 110 display an image (Graphical User Interface (GUI)) for receiving an input of the material of the inspection object and the kind of the defect. In a case where the material of the inspection object and the kind of the defect are input through an operation input from the operation unit 104, the frequency bandwidth selection unit 118 specifies the frequency bandwidth suitable for detecting the defect according to the input material of the inspection object and the input kind of the defect and selects a band-pass filter that passes a signal of the specified frequency bandwidth. With this, the image P20 after transform to be used in creating the training data is created.

Figure 10:
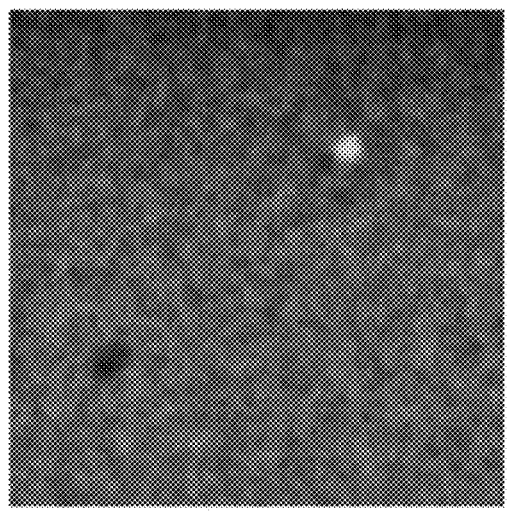
FIG. 10 is a diagram showing a first example of an image to which the band-pass filter is applied.
Figure 11:
FIG. 11 is a diagram showing a second example of an image to which the band-pass filter is applied.
Figure 12:
FIG. 12 is a diagram showing a third example of an image to which the band-pass filter is applied.

FIGS. 10 to 12 are diagrams showing an example of an image to which the band-pass filter is applied. Here, the size of the individual defect image can be set to 30 mm×30 mm as an example. FIG. 10 shows an example where a 0.5-fold (two frequency division) frequency in a defect image is enhanced using the band-pass filter having the characteristic 2 of FIG. 9. FIG. 11 shows an example where a 0.25-fold (four frequency division) frequency in a defect image is enhanced using the band-pass filter having the characteristic 1 of FIG. 9. FIG. 12 shows an example where the 0.25-fold (four frequency division) and the 0.5-fold (two frequency division) frequency in a defect image are simultaneously enhanced using the band-pass filter having the characteristic 1 and the characteristic 2 of FIG. 9. In this way, the band-pass filter is prepared according to the material of the inspection object in the training-use image P10 and the kind of the defect to be detected, whereby it is possible to create an image for training data suitable for detecting the defect.

The training data creation unit 122 acquires the image P20 after transform from the frequency bandwidth selection unit 118.

In addition, the training data creation unit 122 acquires information relating to the position and the kind of the defect in the training-use image P10 from the defect information acquisition unit 120. In regard to an acquisition method of the defect information, a method (1) that acquires the defect information by receiving an input from the operator, and a method (2) that acquires the defect information from attached information of the training-use image P10 are considered.

The method (1) is a method that acquires the defect information based on an input of information from the operator. In a case of the method (1), the defect information acquisition unit 120 makes the display unit 110 display an image (hereinafter, referred to as the image P20 after transform) corresponding to the frequency bandwidth signal selected by the frequency bandwidth selection unit 118. Then, the defect information acquisition unit 120 receives an input of the defect information relating to the position and the kind of the defect included in the image P20 after transform displayed on the display unit 110 through the operation unit 104 (see FIG. 18).

In a case of the method (2), the defect information including information relating to the position and the kind of the defect is recorded as attached information in association with the training-use image P10 that is provided as a sample from the designer or the manager of a facility or the like, in which the inspection object is mounted. The training-use image acquisition unit 114 acquires the defect information along with the training-use image P10, and the defect information acquisition unit 120 reads information relating to the position and the kind of the defect in the training-use image P10 from the defect information (see FIG. 19).

The training data creation unit 122 cuts the individual defect images P20-1, P20-2, P20-3, . . . , and P20-*n* from the image P20 after transform based on the defect information. In addition, the training data creation unit 122 analyzes the shades of the images to obtain feature quantities in the defect images P20-1, P20-2, P20-3, . . . , and P20-*n*. Then, the training data creation unit 122 creates training data with the individual defect images P20-1, P20-2, P20-3, . . . , and P20-*n* and the feature quantities in the individual defect images as input and the kinds of the defects as output.

Figure 13:
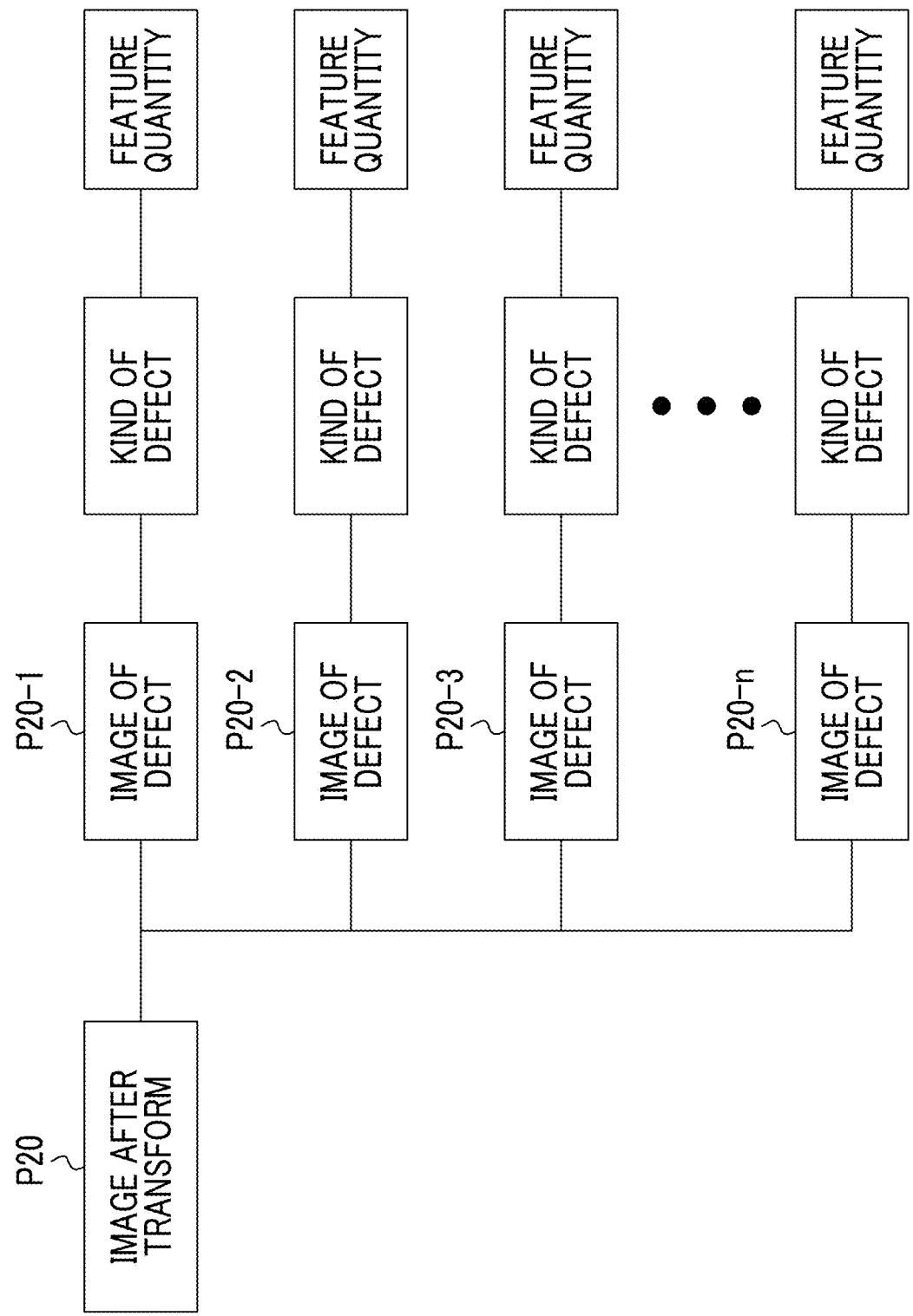
FIG. 13 is a diagram schematically showing training data.

FIG. 13 is a diagram schematically showing the training data, and FIG. 14 is a diagram showing the training data in a simplified form.

As shown in FIG. 13, the training data includes data of the defect images P20-1, P20-2, P20-3, . . . , and P20-*n*, the feature quantities in the defect images acquired from the defect images, and information indicating the kinds of the defects. Here, the size of each of the defect images P20-1, P20-2, P20-3, . . . , and P20-*n* can be set to 30 mm×30 mm as an example.

As shown in FIG. 14, the training data includes the individual defect images P20-1, P20-2, P20-3, . . . , and P20-n and the feature quantities in the individual defect images as "input" and information representing the kinds of the defects as "output". In regard to the "output" in the training data, there is an output referred to as a training signal, a teaching signal, correct answer data, or a label. In FIG. 14, the feature quantities are omitted.

In the example shown in FIG. 14, the defect images P20-1 and P20-2 correspond to a defect due to contamination of a metal (dissimilar metal) different from the material of the inspection object at the time of casting of the inspection object, and the defect image P20-3 corresponds to a defect due to inflow of air at the time of casting of the inspection object.

The learning unit 124 makes the defect determiner 126 perform learning using the training data created by the training data creation unit 122. The learning unit 124 transfers the defect determiner 222 after learning to the defect inspection device 200. Here, as the defect determiners 126 and 222, for example, a neural network, deep learning, a decision tree, a linear classifier, a support vector machine (SVM), discriminant analysis, or the like can be used.

In the learning unit 124, the defect images and the feature quantities in the defect images read from the training data are input to the defect determiner 126 before learning, and learning is performed such that the same output as information indicating the kinds of the defects included in the input defect images is obtained in the training data. Here, as the feature quantity in the defect image, for example, an average of lightness or brightness in the image P20 after transform, an area of the defect, a perimeter and flatness, a length of a major axis in a case where the defect is approximated to an ellipse, a gradient of the major axis with respect to a feature point (for example, an end surface, a center axis, or the like of the inspection object) of the inspection object, or the like is employed.

The learning unit 124 transfers a learning result, that is, the defect determiner 222 after learning to the defect inspection unit 220 of the defect inspection device 200. Here, the defect determiner 222 is specifically data that includes information indicating the structure and values of variables of the defect determiner 222, and is used in defect inspection in the defect inspection unit 220.

The defect inspection unit 220 performs defect inspection on the inspection object image P30 using the defect determiner 222 transferred from the learning unit 124 of the training data creation device 100

[Configuration of Imaging System]

Figure 15:
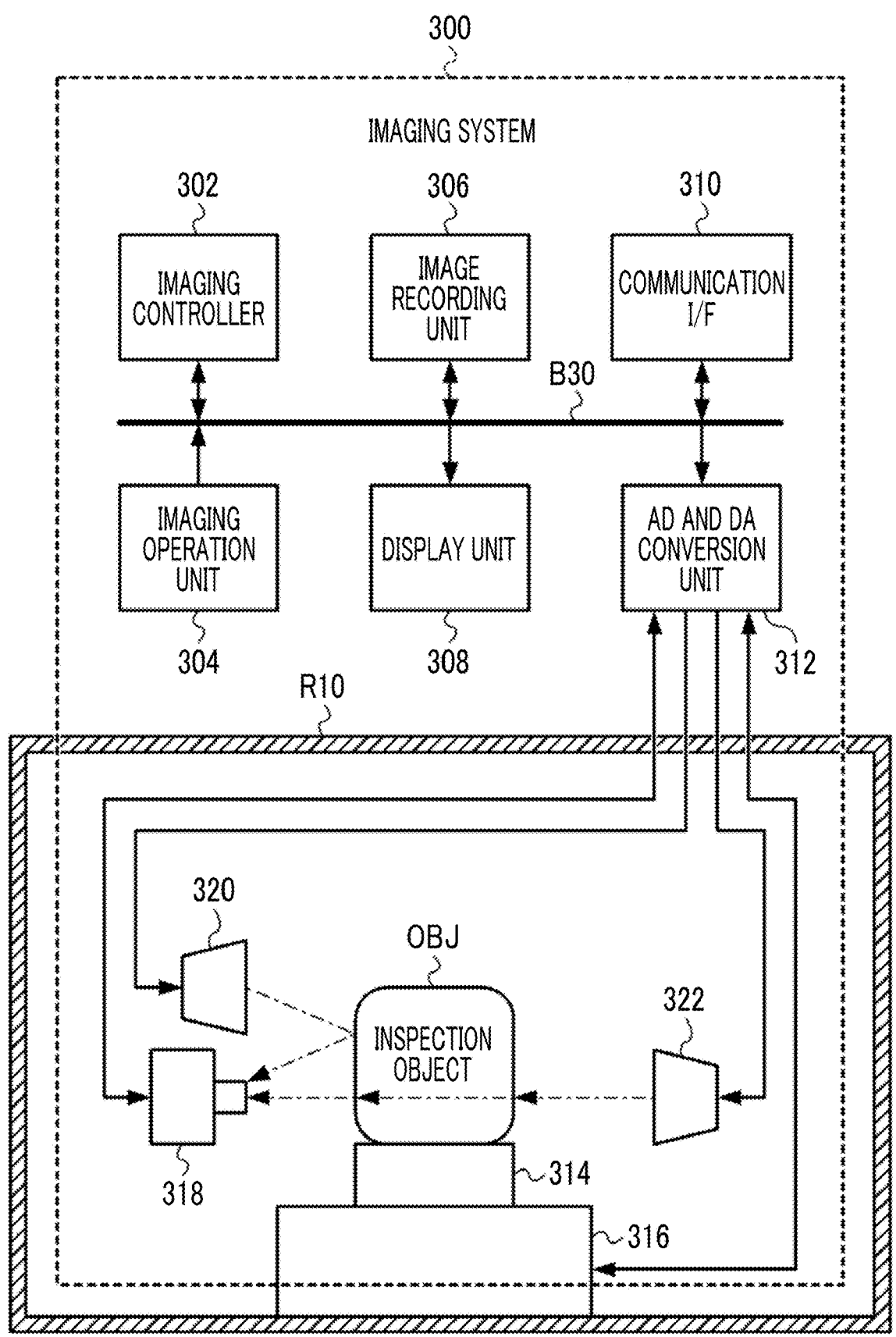
FIG. 15 is a block diagram showing an example of an imaging system.

Next, the imaging system 300 that images an image of the inspection object OBJ will be described referring to FIG. 15. FIG. 15 is a block diagram showing an example of the imaging system 300.

The imaging system 300 images the inspection object OBJ placed in an imaging chamber R10. As shown in FIG. 15, the imaging system 300 comprises an imaging controller 302, an imaging operation unit 304, an image recording unit 306, a display unit 308, a communication interface (communication I/F) 310, an analog to digital and digital to analog (AD and DA) conversion unit 312, a stage 314, a stage drive unit 316, a camera 318, and radiation sources 320 and 322.

The imaging controller 302 includes a central processing unit (CPU) that controls the operation of each unit of the imaging system 300, and is connected to each unit of the imaging system 300 through a bus B30. The imaging controller 302 receives an operation input from the operator (radiographer) through the imaging operation unit 304 and transmits a control signal according to the operation input to each unit of the imaging system 300 to control the operation of each unit.

The imaging operation unit 304 is an input device that receives an operation input from the operator, and includes a keyboard that is provided for character input or the like, and a pointing device (for example, a mouse, a trackball, or the like) that is provided for operating a pointer, icons, and the like displayed on the display unit 308. The operator can perform, through the imaging operation unit 304, an input of information relating to the inspection object OBJ, an input (for example, including settings of imaging conditions of an exposure time, a focal length, a stop, and the like, an imaging angle, an imaging point, and the like) of an instruction for the camera 318 to execute imaging, an input (for example, including settings of an irradiation start time, an irradiation duration, an irradiation angle, irradiation intensity, and the like) of an instruction for the radiation sources 320 and 322 to irradiate radiation, and an input of an instruction to record acquired image data in the image recording unit 306.

The image recording unit 306 records the image (inspection object image P30) of the inspection object OBJ captured by the camera 318. In the image recording unit 306, information for specifying the inspection object OBJ is recorded in association with image data.

The display unit 308 is a device that displays an image. As the display unit 308, for example, a liquid crystal monitor can be used.

The communication I/F 310 is means for performing communication with an external device through the network or the like. The inspection object image P30 captured in the imaging system 300 can be transferred to the defect inspection device 200 through the communication I/F 310.

The AD and DA conversion unit 312 converts a digital control signal output from the imaging controller 302 to an analog signal and transmits the analog signal to each unit in the imaging chamber R10, for example, the stage drive unit 316 and the radiation sources 320 and 322.

The AD and DA conversion unit 312 converts an analog signal (for example, a signal indicating a position of the stage 314 detected by the stage drive unit 316) output from each unit in the imaging chamber R10 to a digital signal and transmits the digital signal to the imaging controller 302. The imaging controller 302 can make the display unit 308 display, for example, a movable range of the stage 314 based on the signal indicating the position of the stage 314.

The camera 318 and the radiation sources 320 and 322 are arranged inside the imaging chamber R10. The radiation sources 320 and 322 are, for example, X-ray sources, and a partition wall between the imaging chamber R10 and the outside, and an entrance are subjected to X-ray protection with an X-ray protection material (for example, lead, concrete, or the like). Here, the radiation sources 320 and 322 are not limited to X-ray sources, and may be, for example, electron beam sources or visible light sources. In a case where imaging is performed by irradiating the inspection object OBJ with visible light, there is no need to use the imaging chamber R10 subjected to protection.

The radiation sources 320 and 322 irradiate the inspection object OBJ placed on the stage 314 in the imaging chamber R10 with radiation according to an instruction from the imaging controller 302.

The camera 318 receives radiation that is emitted from the radiation source 320, irradiates the inspection object OBJ, and is reflected by the inspection object OBJ or radiation that is emitted from the radiation source 322, irradiates the inspection object OBJ, and is transmitted through the inspection object OBJ to image the inspection object OBJ according to the instruction to execute imaging from the imaging controller 302.

The inspection object OBJ is placed on the stage 314. The stage drive unit 316 includes an actuator, a motor, or the like that moves the stage 314, and can move the stage 314. The camera 318 and the radiation sources 320 and 322 are mounted to be movable in the imaging chamber R10. The operator can control relative positions, distances, and angles of the inspection object OBJ, the camera 318, and the radiation sources 320 and 322 through the imaging controller 302, and can image any point of the inspection object OBJ.

The radiation sources 320 and 322 end irradiation of inspection object OBJ with radiation in synchronization with the end of the execution of imaging in the camera 318.

In the example shown in FIG. 15, although the camera 318 is arranged inside the imaging chamber R10, the camera 318 may be arranged outside the imaging chamber R10.

In the example shown in FIG. 15, although one camera 318 and two radiation sources 320 and 322 are provided, the number of cameras and the number of radiation sources are not limited thereto. For example, the number of cameras and the number of radiation sources may be plural or may be one.

In the example shown in FIG. 15, although imaging is performed in a state in which the inspection object OBJ is placed on the stage 314 in the imaging chamber R10, the invention is not limited thereto. In a case where the inspection object OBJ is hardly carried into the imaging chamber R10, the operator may capture the inspection object image P30 using an X-ray nondestructive inspection device comprising a portable X-ray generation device and an X-ray imaging device.

[Training Data Creation Method and Learning using Training Data]

Next, a training data creation method and learning using training data according to the embodiment will be described referring to FIGS. 16 to 19.

Figure 16:
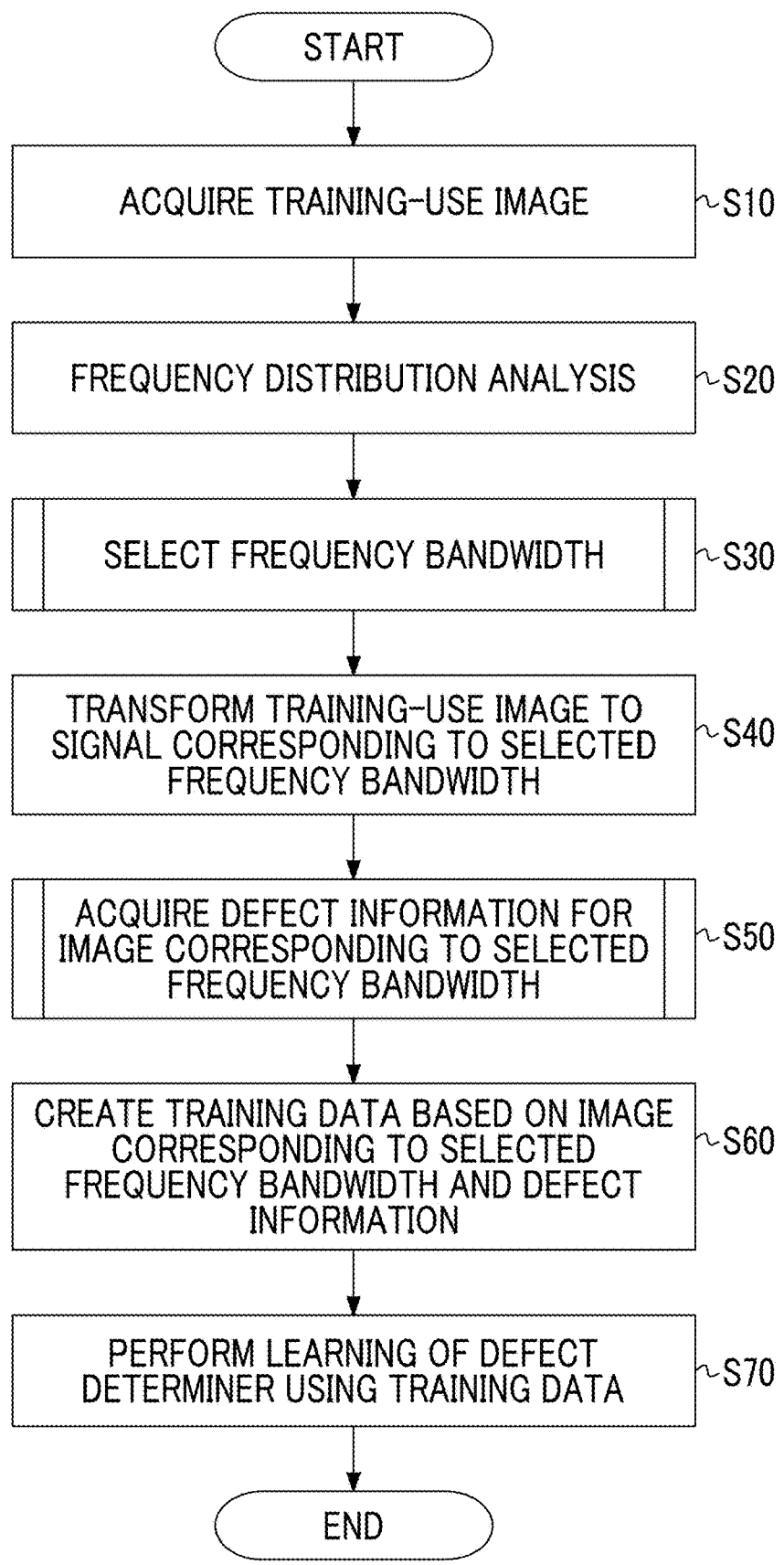
FIG. 16 is a flowchart showing a flow of processing for creating training data and learning a defect determiner using the created training data according to the first embodiment of the invention.

FIG. 16 is a flowchart showing a flow of processing for creating training data and performing learning of a defect determiner using the created training data according to the first embodiment of the invention.

First, the training-use image acquisition unit 114 acquires the training-use image P10 (Step S10: a training-use image acquisition step). Here, the training-use image P10 may be an image that is provided as a sample of a defect image from a designer or a manager of a facility or the like, in which the inspection object is mounted, or may be an image obtained by capturing the image of the inspection object, in which a defect occurs, with the imaging system 300.

Next, the frequency distribution analysis unit 116 executes the frequency distribution analysis on the training-use image P10 and eliminates a global shade distribution, for example, change in shade at a low frequency from the frequency bandwidth signal acquired from the training-use image P10 to standardize a shade difference due to a defect to a shade difference centering on reference density (for example, gray 50%) (Step S20: a frequency distribution analysis step). In Step S20, Fourier transform, for example, fast Fourier transform (FFT) or discrete cosine transform (DCT), may be performed on the training-use image P10.

Next, the frequency bandwidth selection unit 118 selects the frequency bandwidth signal to be used in creating training data from the analysis result in the frequency distribution analysis unit 116 (Step S30: a frequency bandwidth selection step).

Figure 17:
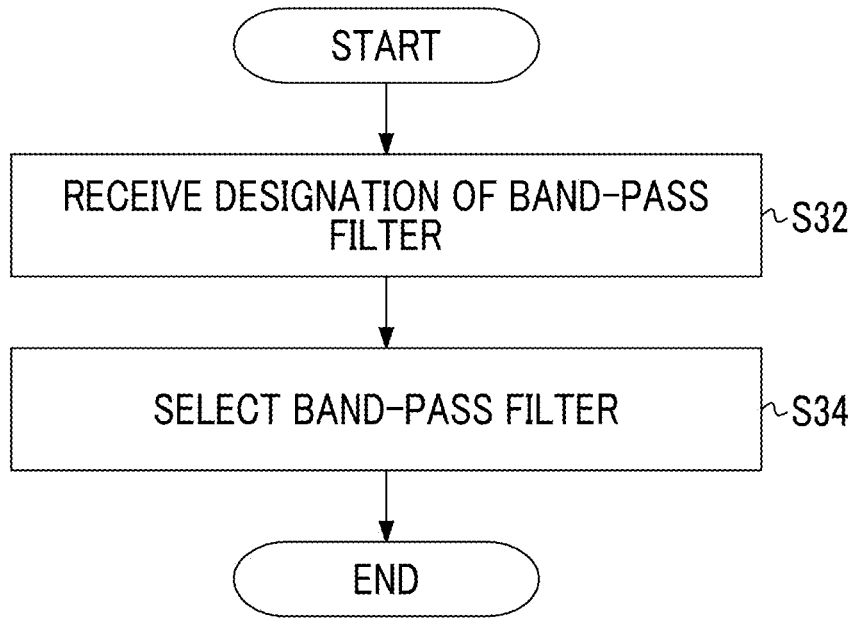
FIG. 17 is a flowchart showing a flow of processing in a frequency bandwidth selection step of FIG. 16.

FIG. 17 is a flowchart showing a flow of processing in the frequency bandwidth selection step of FIG. 16. First, the frequency bandwidth selection unit 118 receives the designation of the band-pass filter having the characteristic according to the material of the inspection object and the kind of the defect to be inspect through the operation unit 104 (Step S32: an input step). Next, the frequency bandwidth selection unit 118 selects the band-pass filter designated in Step S32 (Step S34: a frequency bandwidth selection step).

In Step S32, for example, the frequency bandwidth selection unit 118 makes the display unit 110 display a screen (Graphical User Interface (GUI)) for receiving the input of the material of the inspection object and the kind of the defect and receives the input of the material of the inspection object and the kind of the defect through the operation unit 104. In Step S34, the frequency bandwidth selection unit 118 specifies the frequency bandwidth suitable for detecting the defect according to the input material of the inspection object and the input kind of the defect and selects the band-pass filter that passes the signal of the specified frequency bandwidth.

Next, the frequency bandwidth selection unit 118 transforms the training-use image P10 to the frequency bandwidth signal corresponding to the frequency bandwidth selected in Step S30 (Step S40).

Next, the defect information acquisition unit 120 acquires the defect information for the image corresponding to the frequency bandwidth selected in Step S30 (Step S50: a defect information acquisition step in a training data creation step).

Next, the training data creation unit 122 creates the training data based on the image corresponding to the selected frequency bandwidth and the defect information (Step S60: the training data creation step).

Next, the learning unit 124 performs learning of the defect determiner 126 using the training data created in Step S60 (Step S70: a learning step). The defect determiner 222 after learning of Step S70 is transferred from the training data creation device 100 to the defect inspection device 200.

Figure 18:
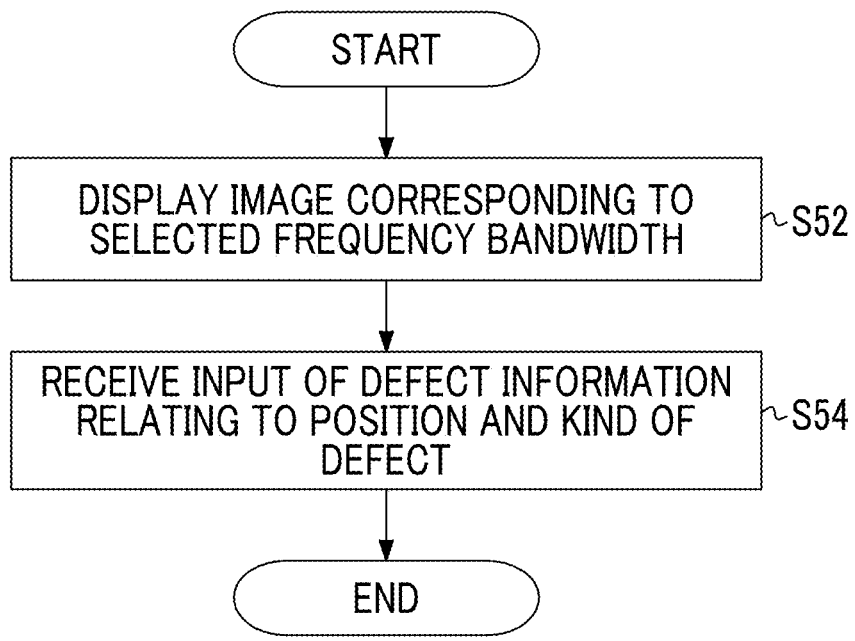
FIG. 18 is a flowchart showing a flow of processing in defect information acquisition step of FIG. 16.

FIG. 18 is a flowchart showing a flow of processing in the defect information acquisition step of FIG. 16.

First, the defect information acquisition unit 120 makes the display unit 110 display the image corresponding to the frequency bandwidth selected in Step S30 (Step S52: a display step).

Next, the defect information acquisition unit 120 receives the input of the defect information including information relating to the position and the kind of the defect included in the image displayed on the display unit 110 through the operation unit 104 (Step S54).

Figure 19:
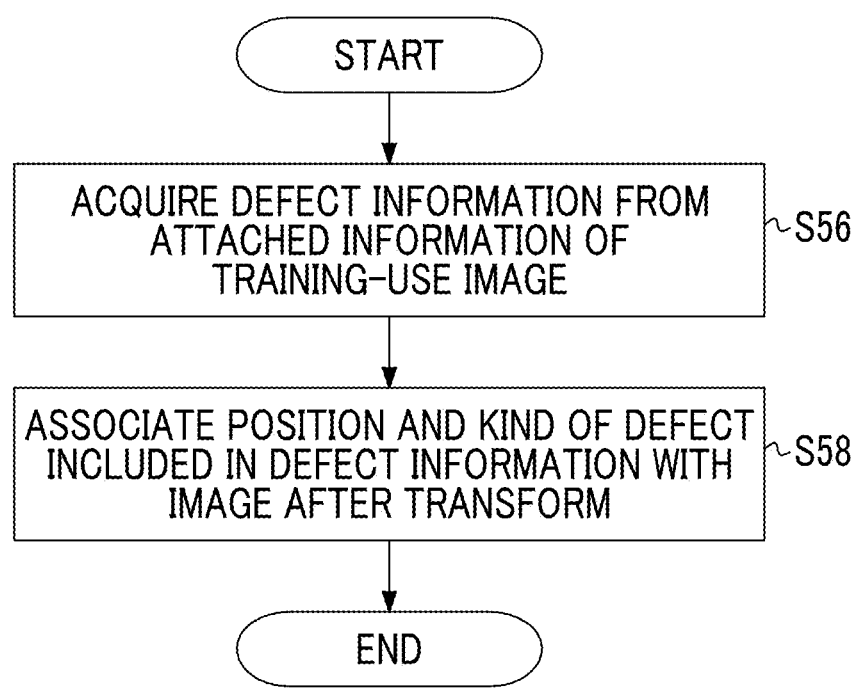
FIG. 19 is a flowchart showing another example of a flow of processing in the defect information acquisition step of FIG. 16.

FIG. 19 is a flowchart showing another example of a flow of processing in the defect information acquisition step of FIG. 16.

First, the defect information acquisition unit 120 acquires the defect information including information relating to the position and the kind of the defect included in the training-use image P10 from the attached information of the training-use image P10 (Step S56).

Next, the defect information acquisition unit 120 stores information relating to the position and the kind of the defect included in the defect information in association with the image of the defect in the image P20 after transform and coordinates indicating the position of the defect (Step S58).

Through the process described in FIG. 18 or 19, information relating to the position and the kind of the defect included in the training-use image P10 is input to the training data creation device 100.

[Inspection of Defect]

Figure 20:
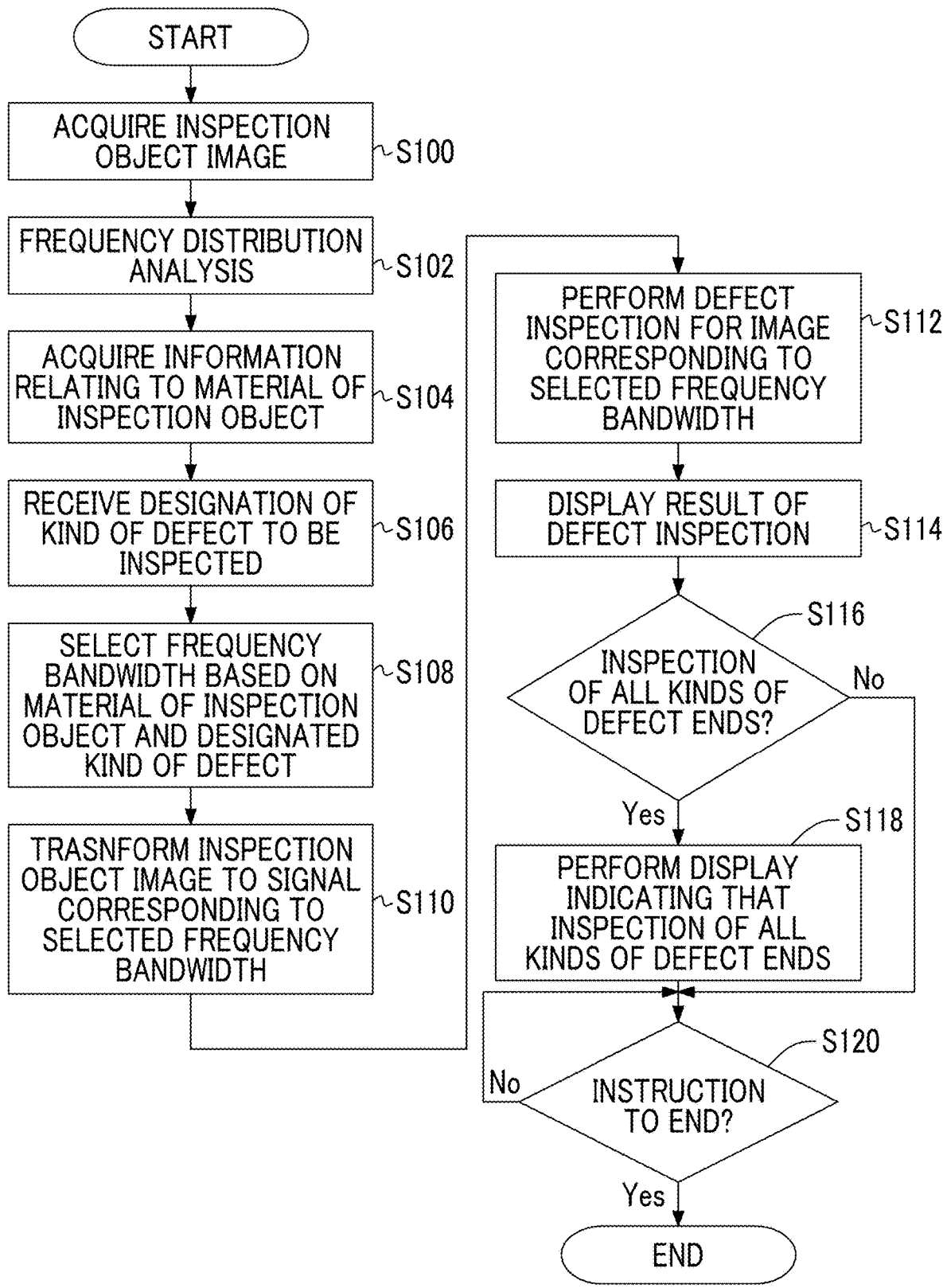
FIG. 20 is a flowchart showing a flow of processing in a defect inspection method according to the first embodiment of the invention.

Next, a defect inspection method according to the embodiment will be described referring to FIG. 20. FIG. 20 is a flowchart showing a flow of processing in the defect inspection method according to the first embodiment of the invention.

First, the image-to-be-inspected acquisition unit 214 acquires the inspection object image P30 from the imaging system 300 or the like (Step S100: an image to be inspected acquisition step).

Next, the frequency distribution analysis unit 216 executes the frequency distribution analysis on the inspection object image P30 (Step S102). The frequency distribution analysis in Step S102 may be executed by the same method as in the frequency distribution analysis (Step S20 of FIG. 16) in the training data creation device 100.

Next, information relating to the material of the inspection object OBJ of the inspection object image P30 is acquired (Step S104). Information relating to the material of the inspection object OBJ may be acquired, for example, by receiving an input from the operator through the operation unit 204 or may be added to the inspection object image P30 as attached information in advance.

Next, the frequency bandwidth selection unit 218 receives the designation of the kind of the defect to be inspected (Step S106). In Step S106, the frequency bandwidth selection unit 218 may receive, for example, a designation input of the kind of the defect from the operator through the operation unit 204.

Next, the frequency bandwidth selection unit 218 selects the frequency bandwidth signal according to information relating to the material of the inspection object OBJ acquired in Step S104 and the kind of the defect designated in Step S106 (Step S108). Here, similarly to the frequency bandwidth selection unit 118 in the training data creation device 100, the frequency bandwidth selection unit 218 may store information relating to the frequency bandwidth suitable for detecting the defect according to the material of the inspection object and the kind of the defect. Then, the frequency bandwidth selection unit 218 may specify the frequency bandwidth suitable for detecting the defect according to the input material of the inspection object and the input kind of the defect, and may select the band-pass filter that passes the signal of the specified frequency bandwidth.

Next, the frequency bandwidth selection unit 218 transforms the inspection object image P30 to the frequency bandwidth signal corresponding to the frequency bandwidth selected in Step S108 (Step S110). Similarly to the image P20 after transform to be used in creating training data, the inspection object image after transform of Step S110 becomes an image with the shade difference of the 256 gradations, in which the shade is standardized.

Next, the defect inspection unit 220 performs defect inspection on the image corresponding to the frequency bandwidth selected in Step S108 using the defect determiner 222 after learning (Step S112: a defect inspection step).

Next, the defect inspection unit 220 makes the display unit 210 display a result of the defect inspection in Step S112 (Step S114).

Next, the controller 202 determines whether or not the defect inspection ends for all kinds of defects (Step S116). In a case where the defect inspection ends for all kinds of defects (in Step S116, Yes), the controller 202 makes the display unit 210 perform display indicating that the defect inspection ends for all kinds of defects, in addition to the display of the result of the defect inspection in Step S114 (Step S118), and progresses to Step S120. On the other hand, in a case where the defect inspection does not end for all kinds of defects (in Step S116, No), the controller 202 progresses to Step S120.

Next, in a case where an instruction to end the defect inspection is input through the operation unit 204 (in Step S120, Yes), the process ends. On the other hand, in a case where the instruction to end the defect inspection is not input (in Step S120, No), the display of the result of the defect inspection in Step S114 is continued. Then, the process may be returned to inspection (Step S106) of other kinds of defects according to an operation input from the operation unit 204.

In Step S112, the defect inspection unit 220 cuts the individual defect images from the inspection object image after transform in Step S110. Then, in Step S114, the defect inspection unit 220 may make the display unit 210 display the individual defect images in parallel with the positions and the kinds of the defects as the result of the defect inspection.

In addition, training data with the individual defect images cut from the inspection object image after transform and the feature quantities obtained from the images as input and the kinds of the defects as output, and the defect determiner 222 may be made to perform learning using the training data.

Second Embodiment

Figure 21:
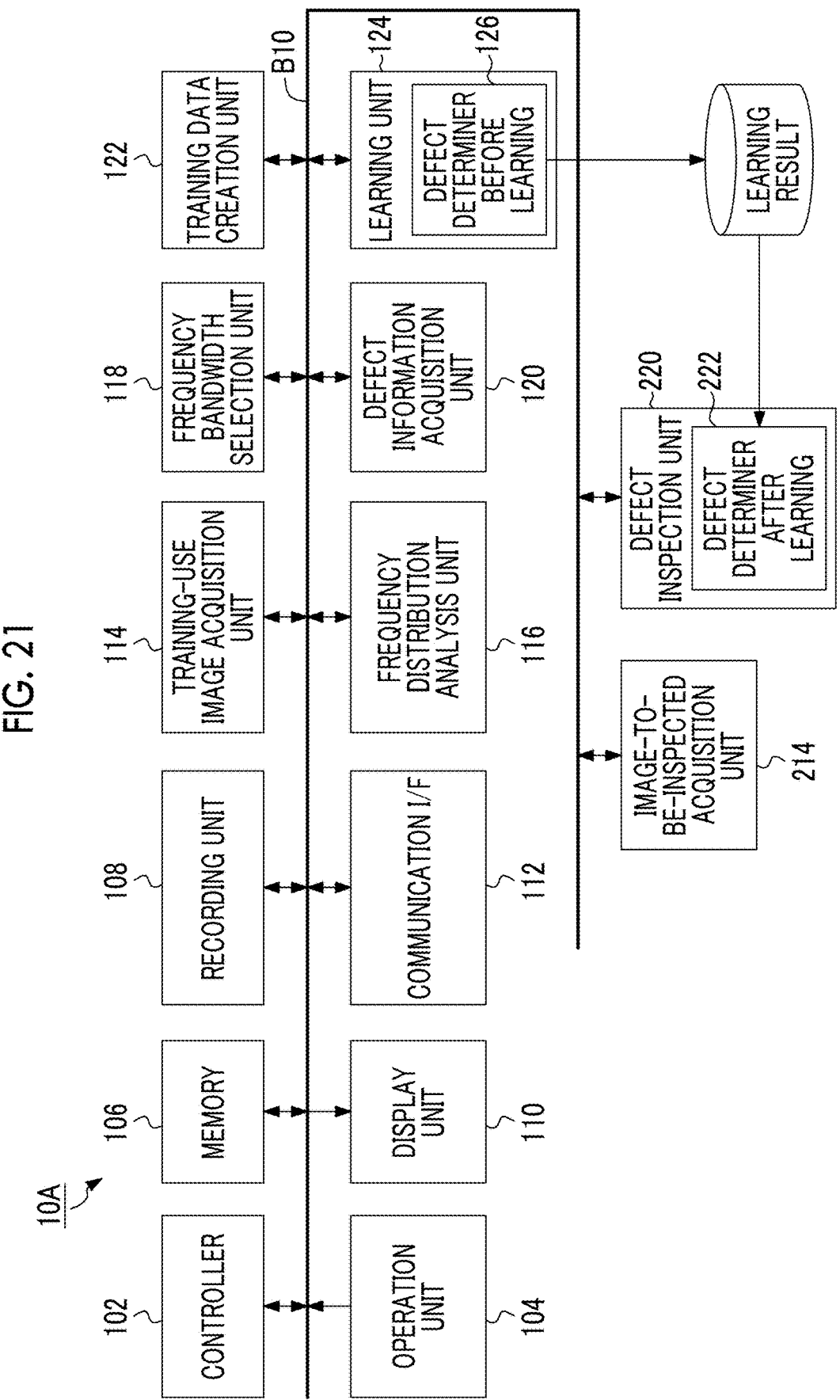
FIG. 21 is a block diagram showing a defect inspection system according to a second embodiment of the invention.

FIG. 21 is a block diagram showing a defect inspection system according to a second embodiment of the invention.

In the first embodiment, although the training data creation device 100 and the defect inspection device 200 are constituted as independent devices, the training data creation device 100 and the defect inspection device 200 may be constituted as one device.

As shown in FIG. 21, a defect inspection system 10A according to the embodiment comprises an image-to-be-inspected acquisition unit 214 and a defect inspection unit 220, in addition to the configuration of the training data creation device 100 shown in FIGS. 2 and 4. In the embodiment, the controller 102, the operation unit 104, the memory 106, the recording unit 108, the display unit 110, and the communication I/F 112 are used in common in both processes of training data creation and defect inspection. The frequency distribution analysis unit 116 and the frequency bandwidth selection unit 118 are also used for processing on the inspection object image P30, in addition to the processing on the training-use image P10.

The entire system including the imaging system 300 in addition to the training data creation device 100 and the defect inspection device 200 may be controlled through the same controller, operation unit, and display unit.

An application range of each embodiment of the invention is not limited to defect inspection using an image obtained by imaging equipment, such as piping. The embodiments can also be applied to, for example, automatic defect classification (ADC) using a scanning electron microscope (SEM) image that is performed in defect inspection of painting of an automobile or the like, and a semiconductor manufacturing process.

The invention can also be implemented as a program (a training data creation program and a defect inspection program) that causes a computer to implement the above-described processing, or a non-transitory recording medium or a program product storing the program. The program is applied to the computer, whereby it is possible to cause arithmetic means, recording means, and the like to implement functions corresponding to the respective steps of the training data creation method and the defect inspection method according to the embodiments.

In the respective embodiments, for example, the hardware structures of processing units that execute various kinds of processing, such as the training-use image acquisition unit 114, the frequency distribution analysis unit 116, the frequency bandwidth selection unit 118, the defect information acquisition unit 120, the training data creation unit 122, the learning unit 124, the image-to-be-inspected acquisition unit 214, the frequency distribution analysis unit 216, the frequency bandwidth selection unit 218, and the defect inspection unit 220, can be implemented as various processors described below. Various processors include a central processing unit (CPU) that is a general-purpose processor executing software (program) to function as various processing units, a programmable logic device (PLD) that is a processor capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured of one of various processors described above or may be configured of a combination of two or more processors (for example, a plurality of FPGAs or a combination of a CPU and an FPGA) of the same type or different types. A plurality of processing units may be configured of one processor. As an example where a plurality of processing units are configured of one processor, first, as represented by a computer, such as a client or a server, there is a form in which one processor is configured of a combination of one or more CPUs and software, and the processor functions as a plurality of processing units. Secondly, as represented by system on chip (SoC) or the like, there is a form in which a processor that implements all functions of a system including a plurality of processing units into one integrated circuit (IC) chip is used. In this way, various processing units may be configured using one or more processors among various processors described above as a hardware structure.

In addition, the hardware structure of various processors is, more specifically, an electric circuit (circuitry) in which circuit elements, such as semiconductor elements, are combined.

EXPLANATION OF REFERENCES 10, 10A: defect inspection system
100: training data creation device
102: controller
104: operation unit
106: memory
108: recording unit
110: display unit
112: communication interface
114: training-use image acquisition unit
116: frequency distribution analysis unit
118: frequency bandwidth selection unit
120: defect information acquisition unit
122: training data creation unit
124: learning unit
126: defect determiner before learning
200: defect inspection device
202: controller
204: operation unit
206: memory
208: recording unit
210: display unit
212: communication interface
214: image-to-be-inspected acquisition unit
216: frequency distribution analysis unit
218: frequency bandwidth selection unit
220: defect inspection unit
222: defect determiner after learning
P10: training-use image
P10-1, P10-2, P10-3, . . . , P10-$n$: images of defect in training-use image
P20: training-use image after transform
P20-1, P20-2, P20-3, . . . , P20-$n$: images of defect in training-use image after transform
P30: inspection object image
300: imaging system
302: imaging controller
304: imaging operation unit
306: image recording unit
308: display unit
310: communication interface
312: AD and DA conversion unit
314: stage
316: stage drive unit
318: camera
320, 322: radiation source
OBJ: inspection object
S10 to S70: steps of training data creation method
S100 to S120: steps of defect inspection method

What is claimed is:

1. A training data creation method comprising:
    a training-use image acquisition step of acquiring a training-use image including a received light image created based on reflected light or transmitted light from an inspection object having a defect obtained by irradiating the inspection object with light rays or radiation;
    a frequency distribution analysis step of executing frequency distribution analysis on the training-use image;
    an input step of receiving an input of a parameter for designating a frequency bandwidth;
    a frequency bandwidth selection step of selecting a frequency bandwidth signal from an analysis result of the frequency distribution analysis according to the frequency bandwidth designated by the parameter; and
    a training data creation step of acquiring defect information indicating a defect for an image corresponding to the frequency bandwidth signal and creating training data to be used in learning of a defect inspection device, which inspects a defect of the inspection object, based on the defect information.

2. The training data creation method according to claim 1, further comprising:
    a display step of displaying the image corresponding to the frequency bandwidth signal selected in the frequency bandwidth selection step on a display unit,
    wherein, in the training data creation step, an input of an instruction indicating whether the image corresponding to the frequency bandwidth signal displayed on the display unit is defective or nondefective is received and the training data is created based on the instruction.

3. The training data creation method according to claim 1, wherein, in the training-use image acquisition step, the defect information indicating the defect of the inspection object included in the training-use image is stored in a storage unit in association with the training-use image, and in the training data creation step, the defect information stored in association with the training-use image is acquired to create the training data based on the defect information.

4. The training data creation method according to claim 3, wherein, in the training data creation step, defect information including at least one of a kind or a position of the defect of the inspection object is acquired.

5. The training data creation method according to claim 1, further comprising:
a step of receiving registration of a plurality of band-pass filters corresponding to a material of the inspection object and the defect in the inspection object,
wherein, in the input step, an input of a parameter for designating a band-pass filter to be used in selecting the frequency bandwidth signal from among the plurality of band-pass filters is received, and
in the frequency bandwidth selection step, the frequency bandwidth signal is selected using the band-pass filter designated by the parameter.

6. The training data creation method according to claim 5, wherein, in the input step, the band-pass filter to be used in selecting the frequency bandwidth signal is designated according to a material of the inspection object.

7. The training data creation method according to claim 1, wherein, in the training data creation step, training data including the frequency bandwidth signal selected from the training-use image and the defect information is created.

8. A defect inspection method comprising:
a step of performing learning in a defect inspection device using training data created by the training data creation method according to claim 1;
a step of acquiring an image to be inspected created based on reflected light or transmitted light from an inspection object to be inspected obtained by irradiating the inspection object to be inspected with light rays or radiation; and
a defect inspection step of detecting a defect in the image to be inspected with the defect inspection device having performed the learning.

9. The defect inspection method according to claim 8, wherein the defect inspection step comprises
a step of executing frequency distribution analysis on the image to be inspected,
a step of selecting a frequency bandwidth signal from an analysis result of the frequency distribution analysis on the image to be inspected, and
a step of detecting the defect in the image to be inspected based on the frequency bandwidth signal selected from an analysis result of the frequency distribution analysis on the image to be inspected and the training data.

10. A training data creation device comprising:
one or more processors configured to operate as:
a training-use image acquisition unit that acquires a training-use image including a received light image created based on reflected light or transmitted light from an inspection object having a defect obtained by irradiating the inspection object with light rays or radiation;
a frequency distribution analysis unit that executes frequency distribution analysis on the training-use image;
an input unit that receives an input of a parameter for designating a frequency bandwidth;
a frequency bandwidth selection unit that selects a frequency bandwidth signal from an analysis result of the frequency distribution analysis according to the frequency bandwidth designated by the parameter;
a defect information acquisition unit that acquires defect information indicating a defect for an image corresponding to the frequency bandwidth signal; and
a training data creation unit that creates training data to be used in learning of a defect inspection device, which inspects a defect of the inspection object, based on the defect information.

11. A defect inspection device comprising:
the training data creation device according to claim 10;
and one or more processors configured to operate as:
an image-to-be-inspected acquisition unit that acquires an image to be inspected created based on reflected light or transmitted light from an inspection object to be inspected obtained by irradiating the inspection object to be inspected with light rays or radiation; and
a defect inspection unit that performs learning using training data created by the training data creation device and detects a defect in the image to be inspected.

* * * * *